US009129172B2

(12) United States Patent
Ren et al.

(10) Patent No.: US 9,129,172 B2
(45) **Date of Patent: *Sep. 8, 2015**

(54) INDICIA READING TERMINAL WITH COLOR FRAME PROCESSING

(71) Applicant: Metrologic Instruments, Inc., Blackwood, NJ (US)

(72) Inventors: Jie Ren, Suzhou (CN); Ynjiun Paul Wang, Cupertino, CA (US); Yong Liu, Suzhou (CN); Timothy Meier, Camillus, NY (US); Stephen Patrick Deloge, Palmyra, NY (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/021,814

(22) Filed: Sep. 9, 2013

(65) Prior Publication Data

US 2015/0028102 A1 Jan. 29, 2015

Related U.S. Application Data

(63) Continuation-in-part of application No. 13/164,660, filed on Jun. 20, 2011, now Pat. No. 8,657,200, and a continuation-in-part of application No. 13/217,139, filed on Aug. 24, 2011, now abandoned.

(51) Int. Cl.

| | |
|---|---|
| ***G06K 7/12*** | (2006.01) |
| ***G06K 7/10*** | (2006.01) |
| ***H04N 5/372*** | (2011.01) |
| ***H04N 5/347*** | (2011.01) |
| ***H04N 5/345*** | (2011.01) |
| ***H04N 9/04*** | (2006.01) |

(52) U.S. Cl.

CPC ............ *G06K 7/10722* (2013.01); *H04N 5/347* (2013.01); *H04N 5/3454* (2013.01); *H04N 5/37213* (2013.01); *H04N 9/045* (2013.01)

(58) Field of Classification Search

USPC .................... 235/462.45, 462.04, 462.1, 469; 356/304

IPC ........... G06K 7/12,19/06037, 7/10881, 7/10851

See application file for complete search history.

(56) References Cited

U.S. PATENT DOCUMENTS 8,657,200 B2 * 2/2014 Ren et al. ...................... 235/469

* cited by examiner

*Primary Examiner* — Karl D Frech

(74) *Attorney, Agent, or Firm* — Additon, Higgins, & Pendleton, P.A.

(57) ABSTRACT

An indicia reading terminal can comprise an image sensor integrated circuit having a two-dimensional image sensor, a hand held housing encapsulating the two-dimensional image sensor, and an imaging lens configured to focus an image of a target decodable indicia onto the two-dimensional image sensor. The two-dimensional image sensor can include a plurality of pixels arranged in repetitive patterns. Each pattern can include at least one pixel sensitive in a first spectrum region, at least one pixel sensitive in a second spectrum region, and at least one pixel sensitive in a third spectrum region. The image sensor integrated circuit can be configured to capture a frame of image data by reading out a plurality of analog signals. Each read out analog signal can be representative of light incident on a group of two or more pixels of the plurality of pixels. The image sensor integrated circuit can be further configured to convert the plurality of analog signals to a plurality of digital signals and to store the plurality of digital signals in a memory. The indicia reading terminal can be operative to process the frame of image data for attempting to decode for decodable indicia.

11 Claims, 13 Drawing Sheets

| R | $G_1$ |
|---|---|
| $G_2$ | B |

→ $(G_1 + G_2)/2$  FIG. 3a

| R | $G_1$ |
|---|---|
| $G_2$ | B |

→ $(G_1 + G_2)$  FIG. 3b

| R | $G_1$ |
|---|---|
| $G_2$ | B |

→ $K_1 *R + K_2 *G + K_3 *B$  FIG. 3c

| R | $G_1$ |
|---|---|
| $G_2$ | B |

→ R  FIG. 3d

| R | $G_1$ |
|---|---|
| $G_2$ | B |

→ B  FIG. 3e

Gr11 = (R11+G11a+B11b+B11)/4; Gr21 = (G11a+R21+B11+G21b)/4; Gr31 = (R21+G21a+G21b+B21)/4; etc.
GR12 = (G11b+B11+R12+G12a)/4; Gr22 = (B11+G21b+G12a+R22)/4; Gr32 = (G21b+B21+R22+G22a)/4; etc.
Gr13 = (R12+G12a+G12b+B12)/4; Gr23 = (G12a+R22+B12+G22b)/4; Gr33 = (R22+G22a+G22b+B22)/4; etc.
etc.

INDICIA READING TERMINAL WITH COLOR FRAME PROCESSING

CROSS REFERENCE TO RELATED APPLICATIONS

This application is a continuation-in-part of U.S. patent application Ser. No. 13/164,660 filed Jun. 20, 2011 entitled, "Indicia Reading Terminal with Color Frame Processing." This application is also a continuation-in-part of U.S. patent application Ser. No. 13/217,139 filed Aug. 24, 2011 entitled, "Optical Indicia Reading Terminal with Color Image Sensor." Each of the above applications is incorporated by reference in its entirety.

FIELD OF THE INVENTION

The present invention relates to indicia reading terminals in general and in particular to an optical based indicia reading terminal.

BACKGROUND OF THE INVENTION

Indicia reading terminals are available in multiple varieties. The well known gun style reader as commonly seen at retail store checkout counters is typically available in a form devoid of a keyboard and display. Enhanced functioning indicia reading terminals having keyboards displays and advanced networking communication capabilities are also available. Typically, indicia reading terminals have triggers for activating decoding attempts.

Manufacturers of indicia reading terminals have incorporated image sensors having increased resolution (as measured in terms of numbers of pixels) into their indicia reading terminals. However, performance and cost disadvantages are introduced as a number of pixels of an image sensor is increased. As pixel size becomes smaller, a yielded signal-to-noise ratio (SNR) becomes lower potentially impacting decode performance as well as hand motion tolerance. Also, as a number of pixels increases, memory bandwidth overhead increases.

[The following is an excerpt from U.S. patent application Ser. No. 13/217,139]

Indicia reading terminals are available in multiple varieties. The well known gun style reader as commonly seen at retail store checkout counters is typically available in a form devoid of a keyboard and display. Enhanced functioning indicia reading terminals having keyboards, displays, and advanced networking communication capabilities are also available. Typically, indicia reading terminals have triggers or buttons for activating decoding attempts. Some indicia reading terminals employ color image sensors.

[End of excerpt from U.S. patent application Ser. No. 13/217,139]

SUMMARY OF THE INVENTION

In one embodiment, there is provided an indicia reading terminal comprising an image sensor integrated circuit having a two-dimensional image sensor, a hand held housing encapsulating the two-dimensional image sensor, and an imaging lens configured to focus an image of a target decodable indicia onto the two-dimensional image sensor. The two-dimensional image sensor can include a plurality of pixels arranged in repetitive patterns. Each pattern can include at least one pixel sensitive in a first spectrum region, at least one pixel sensitive in a second spectrum region, and at least one pixel sensitive in a third spectrum region. The image sensor integrated circuit can be configured to capture a frame of image data by reading out a plurality of analog signals. Each read out analog signal can be representative of light incident on a group of two or more pixels of the plurality of pixels. Each group of two or more pixels can include a pixel sensitive in the first spectrum region and a pixel sensitive in the third spectrum region, two pixels sensitive in the second spectrum region, a pixel sensitive in the first spectrum region and a pixel sensitive in the second spectrum region, or a pixel sensitive in the second spectrum region and a pixel sensitive in the third spectrum region. The image sensor integrated circuit can be further configured to convert the plurality of analog signals to a plurality of digital signals and to store the plurality of digital signals in a memory. The indicia reading terminal can be operative to process the frame of image data for attempting to decode for decodable indicia.

In another embodiment, there is provided an indicia reading terminal comprising an image sensor integrated circuit having a two-dimensional image sensor, a hand held housing encapsulating the two-dimensional image sensor, and an imaging lens configured to focus an image of a target decodable indicia onto the two-dimensional image sensor. The two-dimensional image sensor can include a plurality of pixels arranged in repetitive patterns. Each pattern can include at least one pixel sensitive in a first spectrum region, at least one pixel sensitive in a second spectrum region, and at least one pixel sensitive in a third spectrum region. The image sensor integrated circuit can be configured to capture a frame of image data by reading out a plurality of analog signals. Each read out analog signal can be representative of light incident on a pixel of the plurality of pixels. The image sensor integrated circuit can be further configured to convert the plurality of analog signals to a plurality of digital signals and to store the plurality of digital signals in a memory. The indicia reading terminal can be configured to convert digital signals representative of pixel values of a group of two or more pixels into a single digital pixel value. Each group of two or more pixels can include a pixel sensitive in the first spectrum region and a pixel sensitive in the third spectrum region, two pixels sensitive in the second spectrum region, a pixel sensitive in the first spectrum region and a pixel sensitive in the second spectrum region, or a pixel sensitive in the second spectrum region and a pixel sensitive in the third spectrum region. The indicia reading terminal can be operative to process the frame of image data for attempting to decode for decodable indicia.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

[The following is an excerpt from U.S. patent application Ser. No. 13/217,139 with Figure numbers changed to avoid duplication]

Figure 2:
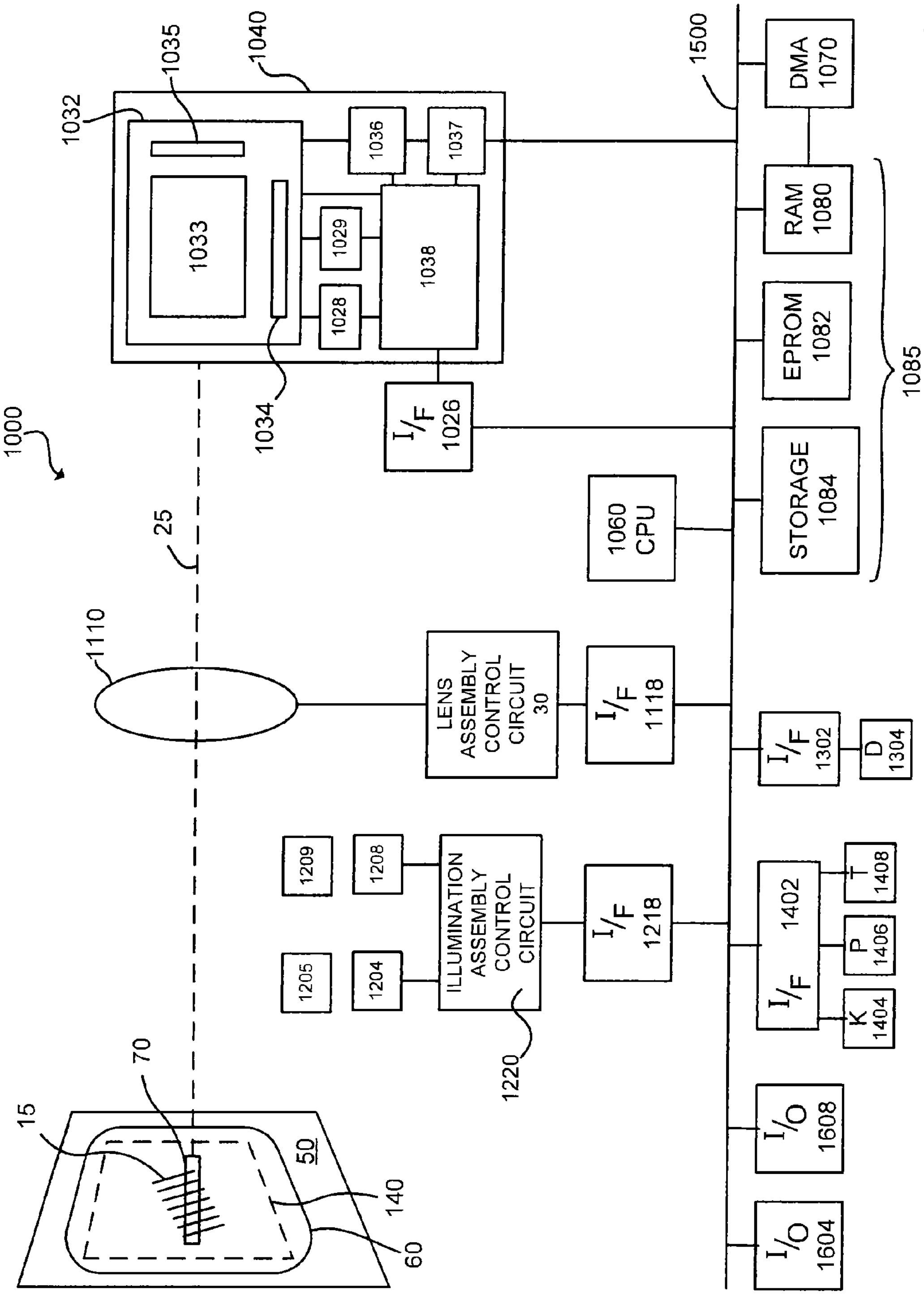
FIG. 2 is a block diagram illustrating an exemplary hardware platform for executing a method described herein.
Figure 7:
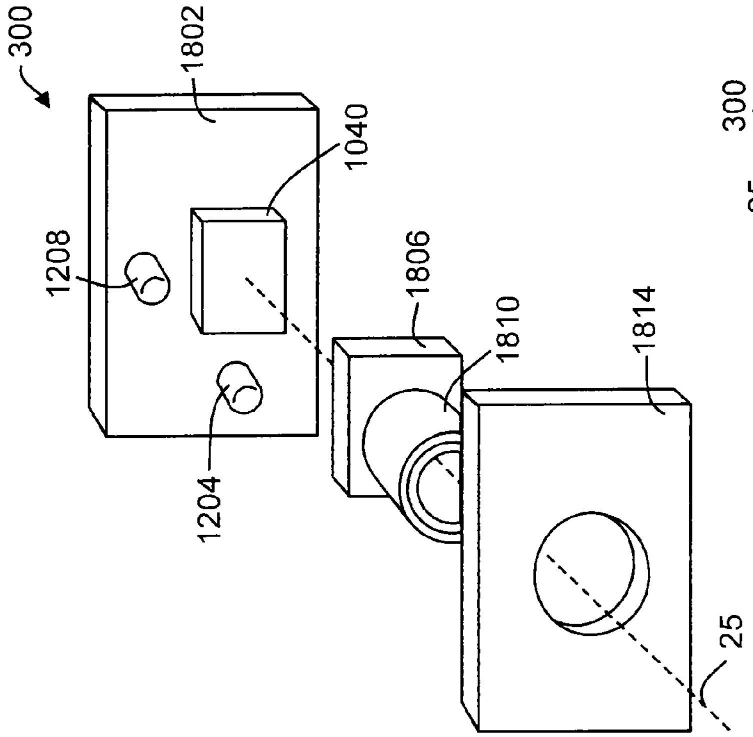
FIG. 7 is an exploded perspective view of an imaging module carrying a subset of circuits as shown in FIG. 2.
Figure 11:
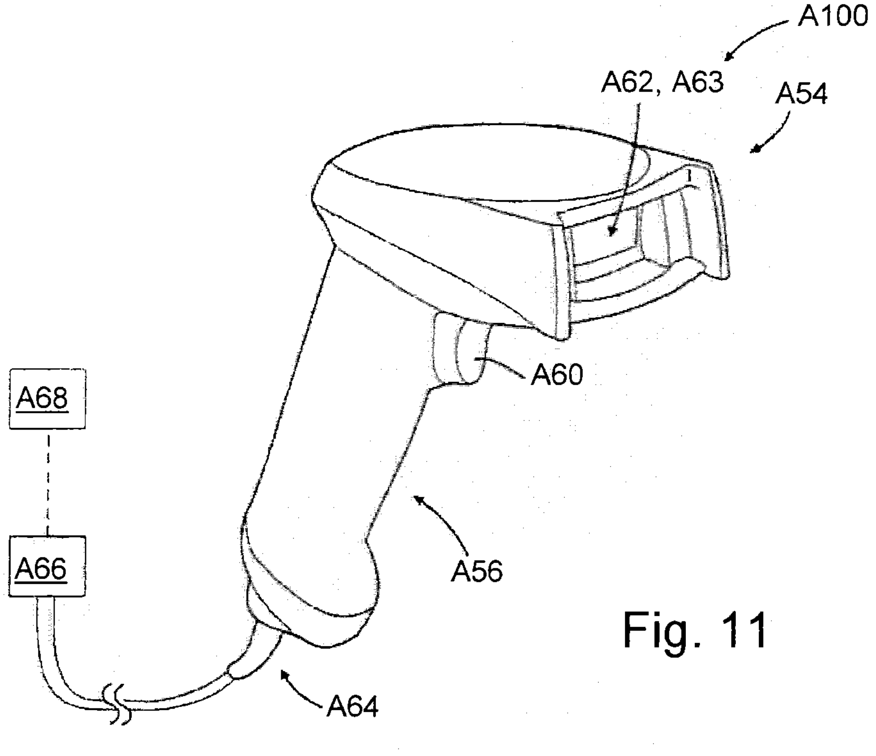
Figure 12:
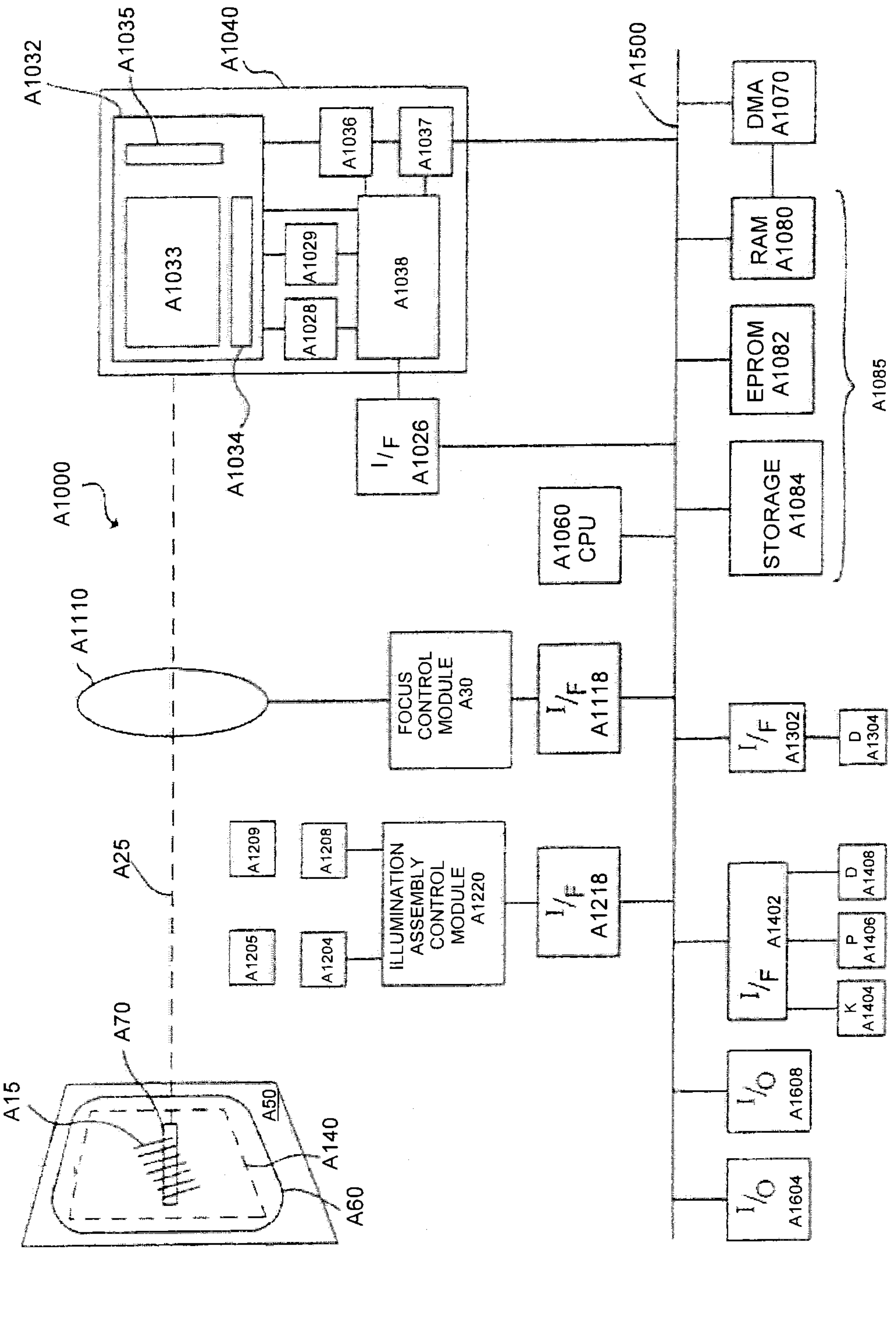
Figure 13A:
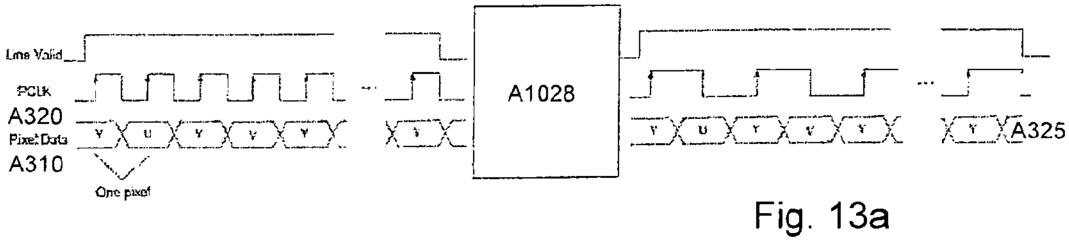
Figure 13B:
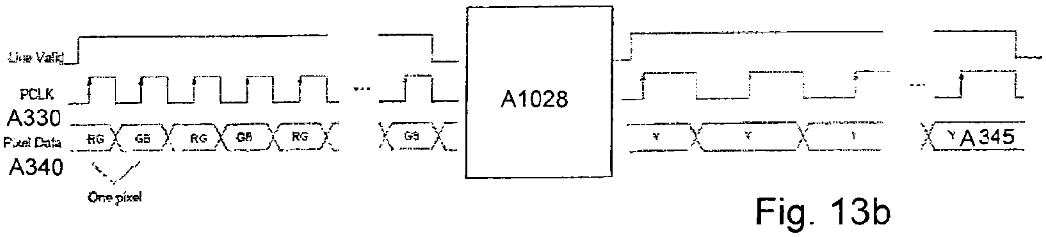
Figure 13C:
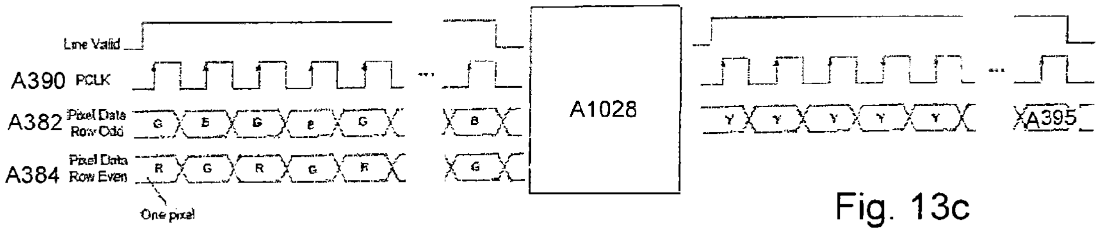
Figure 14:
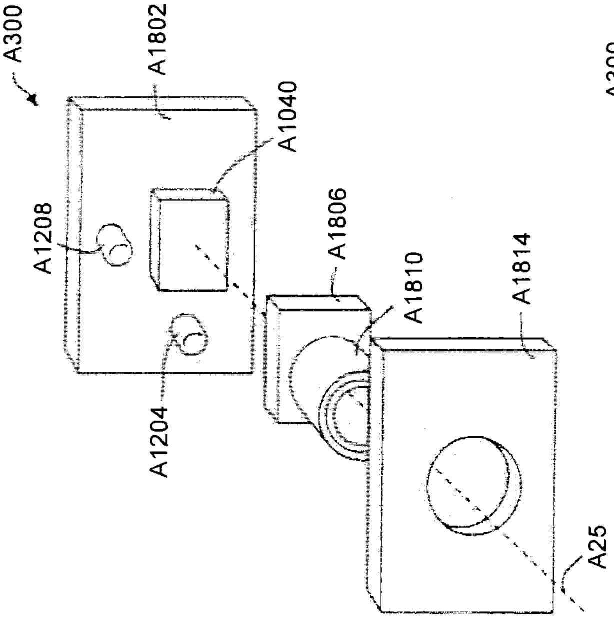
Figure 15:
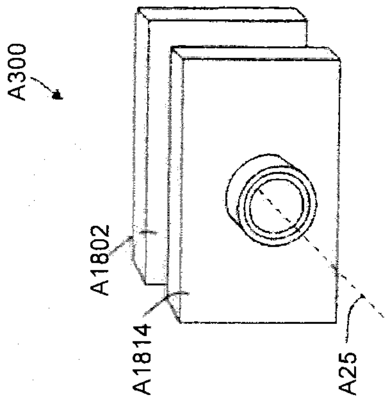
Figure 16:
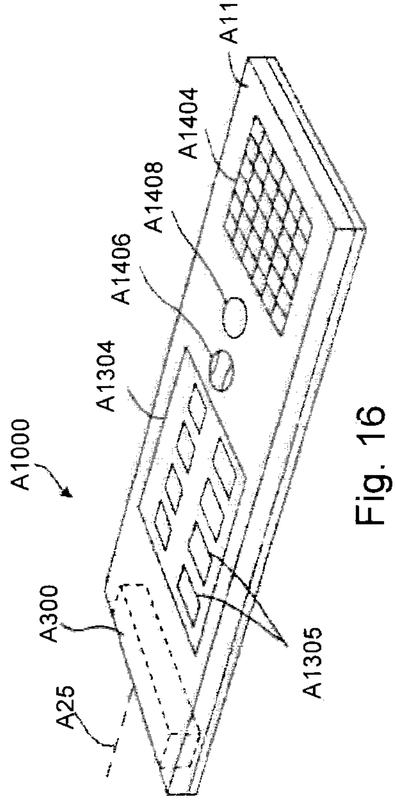

FIG. 11 schematically illustrates one embodiment of an optical indicia reading terminal;

FIG. 12 illustrates a block diagram of one embodiment of the optical indicia reading terminal;

FIGS. 13*a*-13*c* illustrate the functioning of several embodiments of an image data extracting module;

FIG. 14 is an exploded perspective view of an imaging module carrying a subset of circuits as shown in FIG. 2;

FIG. 15 is an assembled perspective view of the imaging module as shown in FIG. 7;

FIG. 16 is a perspective view of a hand held indicia reading terminal incorporating an imaging module as shown in FIGS. 14 and 15.

[End of excerpt from U.S. patent application Ser. No. 13/217,139]

DETAILED DESCRIPTION OF THE INVENTION

There is provided an indicia reading terminal equipped with a two-dimensional color image sensor. The associated image sensor circuitry can be configured to read out analog signals representative of light incident on an image sensor pixel. The image sensor readout pattern can be designed to achieve various effects. In one embodiment, the image sensor integrated circuit can perform frame binning by combining charges from a group of pixels in order to increase the frame readout rate and to improve signal-to-noise ratio (SNR).

Figure 1:
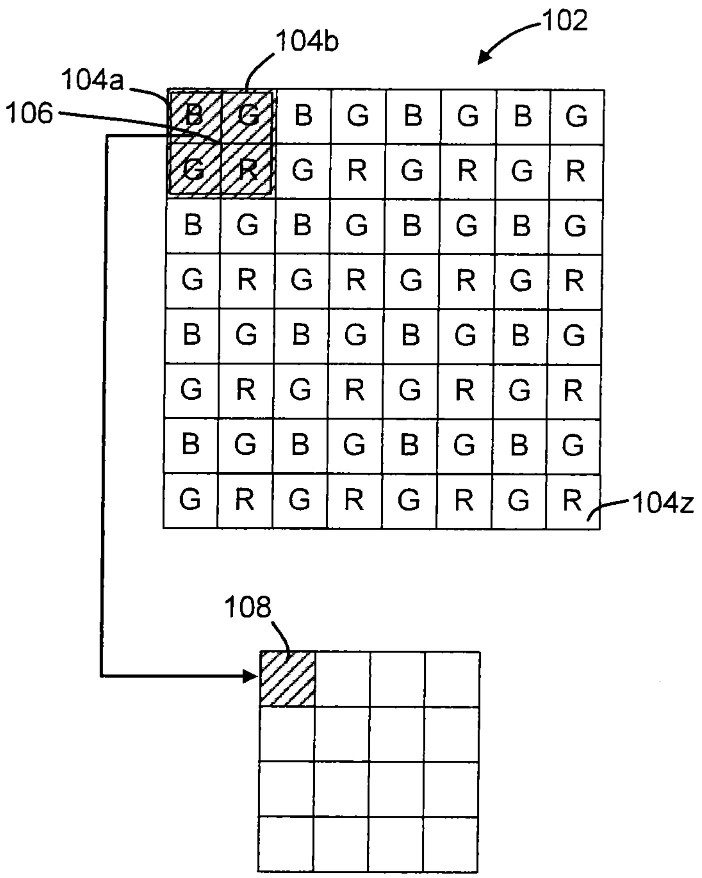
FIG. 1 schematically illustrates a method of 2×2 color image binning described herein.

In a further aspect, the image sensor integrated circuit can be configured to read out analog signals in such a way that each analog signal would be representative of light incident on a group of two or more pixels. In one embodiment, the group of two or more pixels can comprise 2×2 adjacent pixels, and the image sensor integrated circuit can perform 2×2 binning as schematically shown in FIG. 1.

In one embodiment, a color image sensor 102 can comprise a plurality of pixels 104*a*-104*z*. In a further aspect, the pixels 104*a*-104*z* can be arranged in Bayer patterns 106 comprising one pixel sensitive in the red spectrum region, two pixels sensitive in the green spectrum region, and one pixel sensitive in the blue spectrum region, as shown in FIG. 1. In one embodiment, the image sensor integrated circuit can be configured to produce a single analog signal 108 out of every Bayer pattern group 106 by averaging two analog signals associated with two pixels sensitive in the green spectrum region. In another embodiment, the image sensor integrated circuit can be configured to produce a single analog signal 108 out of every Bayer pattern group 106 by summing two analog signals associated with two pixels sensitive in the green spectrum region. In a yet another embodiment, the image sensor integrated circuit can be configured to produce a single analog signal 108 out of every Bayer pattern group 106 by summing three analog signals representative of light incident on three pixels sensitive, respectively, in red, green, and blue spectrum regions. In a yet another embodiment, the image sensor integrated circuit can be configured to produce a single analog signal 108 out of every Bayer pattern group 106 equal to the analog signal representative of the pixel sensitive in the red or blue spectrum region. A skilled artisan would appreciate the fact that other methods of producing a single analog signal representative of a group of four or more pixels are within the scope of the invention.

In a further aspect, the output frame can be a monochrome frame, with the resolution equal to ½ of full frame for 2×2 binning. As noted herein supra, the read-out process performed by an indicia reading terminal according to the invention allows to decrease frame readout rate and to increase SNR.

In another embodiment, the image sensor integrated circuit can be configured to read out the full frame, and frame binning can then be performed in the digital domain, by processing digital values representative of the read out analog signals.

An exemplary hardware platform for carrying out the described method is shown and described with reference to the block diagram of FIG. 2. Indicia reading terminal 1000 can include an image sensor 1032 comprising a multiple pixel image sensor 1033 having pixels arranged in rows and columns, associated column circuitry 1034, and row circuitry 1035. In one embodiment, the image sensor 1033 can be provided by a charge-coupled device (CCD) image sensor. In another embodiment, the image sensor can be provided by a complementary metal-oxide semiconductor (CMOS) image sensor. A skilled artisan would appreciate the fact that other types of image sensors are within the scope of the invention.

Associated with the image sensor 1032 can be amplifier circuitry 1036, and an analog to digital converter 1037 which converts image information in the form of analog signals read out of image sensor 1033 into image information in the form of digital signals. Image sensor 1032 can also have an associated timing and control circuit 1038 for use in controlling e.g., the exposure period of image sensor 1032, gain applied to the amplifier circuitry 1036. The noted circuit components 1032, 1036, 1037, and 1038 can be packaged into a common image sensor integrated circuit 1040. In one example, image sensor integrated circuit 1040 can be provided by an MT9V022 image sensor integrated circuit available from Micron Technology, Inc. In another example, image sensor integrated circuit 1040 can be provided by a Micron MT9P031 image sensor having a 2592×1944 pixel image sensor.

In another aspect, the image sensor 1032 can be provided by a color image sensor. In one embodiment, the image sensor integrated circuit 1040 can incorporate a Bayer pattern filter array (not shown in FIG. 1), which is a color filter array that passes red, green, or blue light to selected pixel sensors of the image sensor 1033, thus forming interlaced grids which are sensitive to red, green, and blue light. The analog signals read out from the image sensor with a Bayer patter filter can produce a color image frame. A skilled artisan would appreciate the fact that other types of color image sensors are within the scope of the invention.

The indicia reading terminal 1000 can be configured to read out analog signals representative of light incident on one or more pixels. The read out analog signals can be amplified by the analog signal amplifier 1036. The analog signals can then be fed to the input of the ADC 1037. The resulting digital values representative of the analog signals can be stored in a system memory such as RAM 1080. Image frame data stored in RAM 1080 can be in the form of multibit pixel values, with each multibit pixel value representing light incident on a pixel of image sensor 1033. A memory 1085 of terminal 1000 can include RAM 1080, a nonvolatile memory such as EPROM 1082 and a storage memory device 1084 such as may be provided by a flash memory or a hard drive memory.

The indicia reading terminal 1000 can include a direct memory access unit (DMA) 1070 for routing image information read out from image sensor 1032 that has been subject to conversion and storage to RAM 1080. In another embodiment, terminal 1000 can employ a system bus providing for bus arbitration mechanism (e.g., a PCI bus) thus eliminating the need for a central DMA controller. Other embodiments of the system bus architecture and/or direct memory access components providing for efficient data transfer between the image sensor 1032 and RAM 1080 can be provided.

In another aspect, the indicia reading terminal 1000 can include CPU 1060 which can be adapted to read out image data stored in memory 1080 and subject such image data to various image processing algorithms.

In another aspect, the indicia reading terminal 1000 can include a variable focus imaging lens 1110 for use in focusing an image of a decodable indicia located within a field of view 140 on a substrate 50 onto image sensor 1033. Imaging light rays can be transmitted about imaging axis 25. Variable focus imaging lens 1110 can be adapted to be capable of multiple best focus distances and multiple focal lengths. Variable focus imaging lens 1110 can be operative to provide a new best focus distance and/or focal length within a fraction of a frame time in response to an applied input control signal being applied to the variable focus imaging lens 1110.

In one embodiment, the variable focus imaging lens 1110 can be provided by a deformable imaging lens, e.g., a deformable fluid lens or gel lens. In another embodiment, the variable focus imaging lens 1110 can be provided by a non-deformable fluid lens, e.g., an electrowetting liquid lens wherein the surface tension of one or more volumes of lens liquid changes in response to a signal being applied to the lens, or a liquid crystal type lens wherein indices of refraction of one or more volumes of lens fluid change in response to a signal being applied to the lens.

The indicia reading terminal 1000 can also include an illumination pattern light source bank 1204 for use in generating an illumination pattern 60 substantially corresponding to a field of view 140 of terminal 1000 and an aiming pattern light source bank 1208 for use in generating an aiming pattern 70 on substrate 50. Shaping optics 1205 and 1209 can be provided for shaping light from bank 1204 and bank 1208 into pattern 60 and into pattern 70 respectively. In use, terminal 1000 can be oriented by an operator with respect to a substrate 50 bearing decodable indicia 15 in such manner that aiming pattern 70 is projected on a decodable indicia 15. In the example of FIG. 2, decodable indicia 15 is provided by a 1D bar code symbol. Decodable indicia could also be provided by 2D bar code symbols or optical character recognition (OCR) characters.

Each of illumination pattern light source bank 1204 and aiming pattern light source bank 1208 can include one or more light sources. Variable focus imaging lens 1110 can be controlled with use of focus control module 30 and the illumination assembly comprising illumination pattern light source bank 1204 and aiming pattern light source bank 1208 can be controlled with use of illumination assembly control module 1220. Focus control module 30 can send signals to variable focus imaging lens 1110 e.g., for changing a best focus distance and/or a focal length of variable focus imaging lens 1110. Illumination assembly control module 1220 can send signals to illumination pattern light source bank 1204 e.g., for changing a level of illumination output by illumination pattern light source bank 1204.

In one example, the indicia reading terminal 1000 can be adapted so that illumination assembly control module 1220 controls light source bank 1204 to have a relatively lower level of illumination output when the best focus distance of imaging lens 1110 is set to a first shorter best focus distance, and a relatively higher level of illumination output when the best focus distance of imaging lens 1110 is set at a longer best focus distance. Such variable illumination settings can be varied within a time that trigger signal 502 remains active. The variable illumination level settings can be synchronized to the certain lens settings set forth in connection with the various configurations described herein infra.

The indicia reading terminal 1000 can also include a number of peripheral devices, e.g., a display 1304 for displaying such information as captured image frames, keyboard 1404, pointing device 1406, and trigger 1408 which may be used to make active a trigger signal 502 for activating frame readout and/or certain decoding processes. The indicia reading terminal 1000 can be adapted so that activation of trigger 1408 activates trigger signal 502 and initiates a decode attempt.

The indicia reading terminal 1000 can also include various interface circuits for coupling the peripheral devices to system address/data bus (system bus) 1500, for communication with CPU 1060 which can also be coupled to system bus 1500. The indicia reading terminal 1000 can include circuit 1026 for coupling image sensor timing and control circuit 1038 to system bus 1500, interface circuit 1118 for coupling focus control module 30 to system bus 1500, interface circuit 1218 for coupling illumination control assembly 1220 to system bus 1500, interface circuit 1302 for coupling display 1304 to system bus 1500, and interface circuit 1402 for coupling keyboard 1404, pointing device 1406, and trigger 1408 to system bus 1500.

In a further aspect, the indicia reading terminal 1000 can include one or more I/O interfaces 1604, 1608 for providing communications with external devices (e.g., a cash register server, a store server, an inventory facility server, a peer terminal 1000, a local area network base station, or a cellular base station). I/O interfaces 1604, 1608 can be interfaces of any combination of known computer interfaces, e.g., Ethernet (IEEE 802.3), USB, IEEE 802.11, Bluetooth, CDMA, GSM.

In a further aspect, the indicia reading terminal 1000 can include a binning module 1028 configured to control the multiple pixel image sensor 1033, associated column circuitry 1034 and row circuitry 1035 in order to modify the readout pattern. In one embodiment, the binning module 1028 can be provided by a dedicated circuitry. In another embodiment, the designation of the binning module 1028 can be pure functional, and the column circuitry 1034 and row circuitry 1035 can be configured to control the readout pattern. In a yet another embodiment, the readout pattern can be controlled by other components of image sensor integrated circuit 1040.

In operation, the light falling on the surface of the image sensor (e.g., provided by a CCD image sensor), can cause accumulation of charge in each pixel. Once the exposure is complete, the charge can be read out, and then the analog signals representative of pixel charge can be digitized by an ADC.

As noted herein supra, the image sensor integrated circuit can in one embodiment perform frame binning by combining charges from a group of pixels in order to increase the frame readout rate and to improve signal-to-noise (SNR) ratio.

In one embodiment, the group of pixels can comprise 2×2 adjacent pixels, and the image sensor integrated circuit can perform 2×2 binning. In another embodiment, the group of pixels can comprise of N×N pixels, wherein N is a positive integer, and the image sensor integrated circuit can perform N×N binning. In a yet another embodiment, the group of pixels can comprise M×N pixels, wherein M and N are positive integers.

In one embodiment, the pixels composing a binning group can be adjacent to each other. In another embodiment, a binning group can comprise a non-adjacent pictures (e.g., by skipping a pre-defined numbers of pixels).

In one embodiment, the read-out process can comprise: (i) transferring charges from several pixels in a given row to a readout register, followed by (ii) shifting each pixel charge from the readout register to an analog amplifier. In one embodiment, step (i) can transfer charges from entire row of pixels. In another embodiment, step (i) can transfer charges of a subset of a row represented by several adjacent pixels. In a yet another embodiment, step (i) can transfer charges of a subset of a row represented by several non-adjacent pixels.

Frame binning can be performed by repeating step (i) of transferring charges from several pixels in a next row before shifting pixels charges from the readout register to the analog amplifier. Thus, the readout register would contain a sum of charges of two or more pixels from several rows. To sum the charges of two or more pixels from several columns, step (ii) of shifting pixel charge from readout register to the analog amplifier can be repeated. The degree of binning (M and N as defined above) can be controlled by the number of repetitions of step (i) and (ii). In one embodiment, the charge averaging can be performed by dividing the total charge by the degree of binning. The above described binning process can be repeated for all pixels composing an image frame.

Figure 3A:
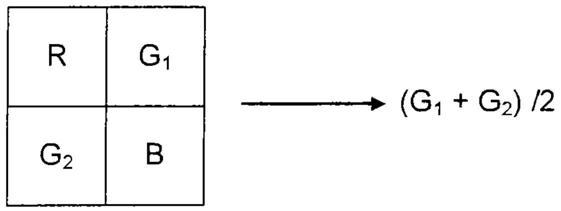
FIG. 3*a* schematically illustrates a method of 2×2 color by averaging, in every Bayer pattern group, two signals representative of two pixels sensitive in the green spectrum region.
Figure 4A:
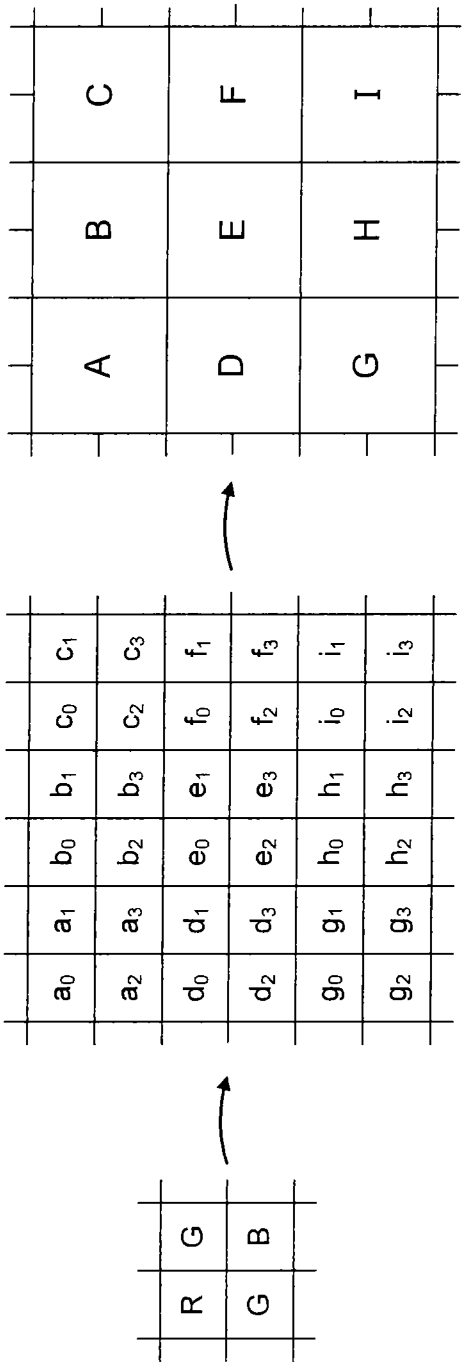
FIGS. 4*a*, 4*b* illustrate binning operations that can be performed by an indicia reading terminal on a captured image frame.

In one embodiment, the image sensor integrated circuit can be configured to produce a single analog signal out of every group of two or more pixels by averaging the analog signals associated with the pixels sensitive in the green spectrum region. In an illustrative embodiment schematically shown in FIG. 3*a*, the image sensor integrated circuit can be configured to produce a single analog signal out of every Bayer pattern group by averaging two analog signals associated with two pixels sensitive in the green spectrum region. According to the embodiment, a Bayer pattern group 302 can be represented by a single monochrome pixel 304 by averaging two analog signals $G_1$ and $G_2$ representative of two pixels sensitive in the green spectrum region: $P=(G_1+G_2)/2$. In a further aspect, for N×N binning, the resulting monochrome pixels can be calculated as $P=(G_1+G_2+\ldots G_N)/N$. In a further aspect, for M×N binning, the resulting monochrome pixels can be calculated as $P=(G_1+G_2+\ldots G_K)/K$, wherein Gi are analog signals representative of the pixels sensitive in the green spectrum region. The above described analog binning process can be repeated for all pixels composing an image frame, as schematically shown in FIG. 4*a*.

In another embodiment, the image sensor integrated circuit can be configured to produce a single analog signal out of every group of two or more pixels by summing the analog signals associated with the pixels sensitive in the green spectrum region. In an illustrative embodiment schematically shown in FIG. 3*b*, the image sensor integrated circuit can be configured to produce a single analog signal out of every Bayer pattern group by summing two analog signals associated with two pixels sensitive in the green spectrum region. According to the embodiment, a Bayer pattern group 306 can be represented by a single monochrome pixel 308 by summing two analog signals $G_1$ and $G_2$ representative of two pixels sensitive in the green spectrum region: $P=(G_1+G_2)$. In a further aspect, for N×N binning, the resulting monochrome pixels can be calculated as $P=G_1+G_2+\ldots G_N$. In a further aspect, for M×N binning, the resulting monochrome pixels can be calculated as $P=G_1+G_2+\ldots G_K$, wherein Gi are analog signals representative of the pixels sensitive in the green spectrum region. The above described analog binning process can be repeated for all pixels composing an image frame, as schematically shown in FIG. 4*a*.

Figure 3B:
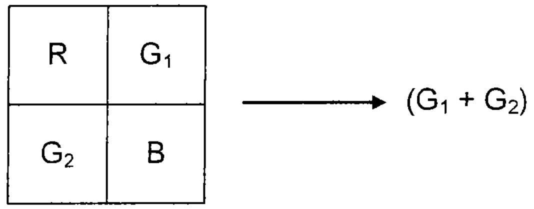
FIG. 3*b* schematically illustrates a method of 2×2 color by summing, in every Bayer pattern group, two signals representative of two pixels sensitive in the green spectrum region.
Figure 3C:
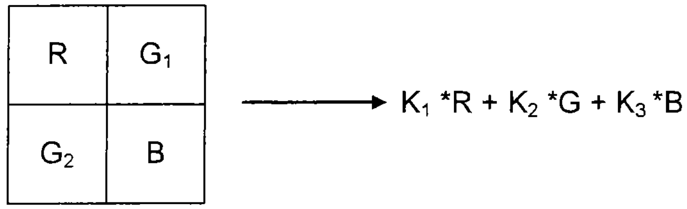
FIG. 3*c* schematically illustrates a method of 2×2 color by summing, in every Bayer pattern group, three signals representative of light incident on three pixels sensitive, respectively, in red, green and blue spectrum regions.

In a yet another embodiment, the image sensor integrated circuit can be configured to produce a single analog signal out of every group of two or more pixels by summing the analog signals representative of light incident on the pixels sensitive, respectively, in red, green and blue spectrum regions. In an illustrative embodiment schematically shown in FIG. 3*c*, the image sensor integrated circuit can be configured to produce a single analog signal out of every Bayer pattern group by summing three analog signals representative of light incident on three pixels sensitive, respectively, in red, green and blue spectrum regions, as schematically shown in FIG. 3*c*. According to the embodiment, a Bayer pattern group 310 can be represented by a single monochrome pixel 312 by summing three analog signals R, G, and B: $P=k_1*R+k_2*G+k_3*B$, wherein $k_1$, $k_2$, $k_3$ are the weight coefficients so that $k_1+k_2+k_3=1$. In a further aspect, for M×N binning, the resulting monochrome pixels can be calculated as $P=\Sigma k_1*R+\Sigma k_2*G+\Sigma k_3*B$ wherein each summing operation is performed for all pixels in the group which are sensitive in a given spectrum region. The above described analog binning process can be repeated for all pixels composing an image frame, as schematically shown in FIG. 4*a*.

Figure 3D:
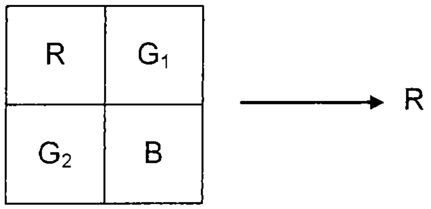
FIG. 3*d* schematically illustrates a method of 2×2 color by producing, in every Bayer pattern group, a signal representative of the pixel sensitive in the red spectrum region.

In a yet another embodiment, the image sensor integrated circuit can be configured to produce a single analog signal out of every group of two or more pixels, the analog signal being equal to the sum of analog signals representative of the pixels sensitive in the red spectrum region. In an illustrative embodiment schematically shown in FIG. 3*d*, the image sensor integrated circuit can be configured to produce a single analog signal out of every Bayer pattern group equal to the analog signal representative of the pixel sensitive in the red spectrum region, as schematically shown in FIG. 3*d*. According to the embodiment, a Bayer pattern group 314 can be represented by a single monochrome pixel 316 by producing an analog signal equal to the analog signal representative of the pixel sensitive in the red spectrum region: P=R. In a further aspect, for M×N binning, the resulting monochrome pixels can be calculated as $P=\Sigma k_1*R$ wherein the summing operation is performed for all pixels in the group which are sensitive in the red spectrum region. The above described analog binning process can be repeated for all pixels composing an image frame, as schematically shown in FIG. 4*a*.

In a yet another embodiment, the image sensor integrated circuit can be configured to produce a single analog signal out of every group of two or more pixels, the analog signal being equal to the sum of analog signals representative of the pixels sensitive in the blue spectrum region. In an illustrative embodiment schematically shown in FIG. 3*e*, the image sensor integrated circuit can be configured to produce a single analog signal out of every Bayer pattern group equal to the analog signal representative of the pixel sensitive in the blue spectrum region. According to the embodiment, a Bayer pattern group 318 can be represented by a single monochrome pixel 320 by producing an analog signal equal to the analog signal representative of the pixel sensitive in the blue spectrum region: P=B. In a further aspect, for M×N binning, the resulting monochrome pixels can be calculated as $P=\Sigma k_1 * B$ wherein the summing operation is performed for all pixels in the group which are sensitive in the blue spectrum region. The above described analog binning process can be repeated for all pixels composing an image frame, as schematically shown in FIG. 4*a*.

In a yet another embodiment, the image sensor integrated circuit can be configured to produce a single analog signal out of every group of two or more pixels, the analog signal being equal to the average of analog signals representative of the N×M neighboring pixels, by sliding an N×M binning window over the array of pixels with the offset of one pixel at every step of the method. Thus, any two groups of N×M neighboring pixels used by the method can overlap by N*(M−1) pixels.

Figure 4B:
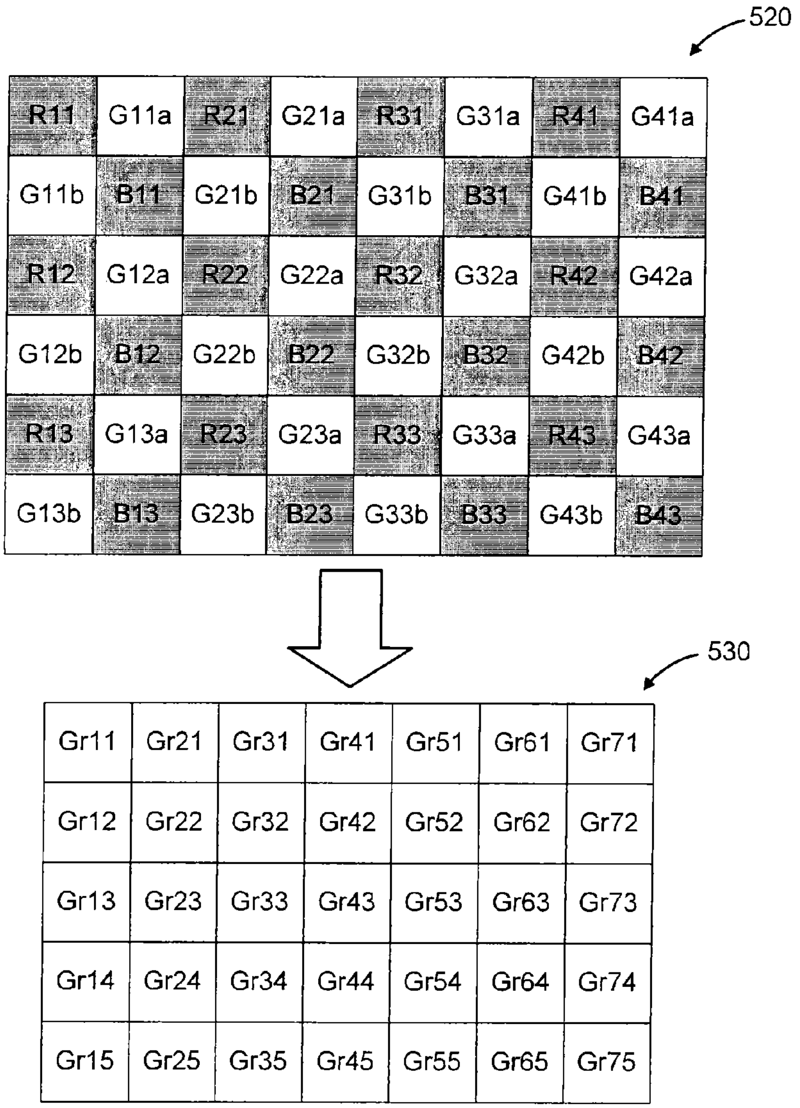

In an illustrative 2×2 binning embodiment schematically shown in FIG. 4*b*, the pixel value $P_{xy}$ at row=x and column=y can be produced as follows:

$$P_{xy}(P_{xy}, P_{x,y+1}, P_{x+1,y}, P_{x+1,y+1})/4$$

According to the embodiment, a source color image 520 having a dimension of K×L pixels can be converted into a binned monochrome image 530 having a dimension of (K−1)×(L−1) pixels by sliding a 2×2 binning window over the array of pixels with the offset of one pixel at every step of the method. The above described analog 2×2 binning process can be repeated for all pixels composing an image frame, as schematically shown in FIG. 4*b*.

In a further aspect, for N×M binning, a source color image having a dimension of K×L pixels can be converted into a binned monochrome image having a dimension of (K−1)×(L−1) pixels by sliding a N×M binning window over the array of pixels with the offset of one pixel at every step of the method. Thus, in an illustrative N×M binning embodiment, the pixel value $P_{xy}$ at row=x and column=y can be produced as follows:

$$P_{xy}=(\Sigma P_{ij})/(N*M),\ \text{wherein}\ i=x, \ldots, x+N-1, j=y, \ldots, y+M-1$$

The above described analog N×M binning process can be repeated for all pixels composing an image frame.

In a further aspect, the binned monochrome image having a dimension of (K−1)×(L−1) pixels can be further N×M binned to generate a resulting monochrome image having a dimension of (K−1)×(L−1)/(N*M).

A skilled artisan would appreciate the fact that other methods of producing a single analog signal representative of a group of two or more pixels are within the scope of the invention.

In a further aspect, the resulting binned frame can be a monochrome frame, which can be suitable for decoding for decodable indicia. In a further aspect, the resolution of the output frame after N×N binning can be equal to 1/N of the image sensor resolution. Hence, the frame readout rate with N×N analog binning can be 1/N of the full frame readout rate. In a further aspect, a binned frame features a reduced noise level and therefore a higher SNR than an unbinned frame. Thus, binning a color image frame can be advantageous for applications which do not require color information. For example, in decoding applications, a higher SNR provides a higher decode success rate and permits successful decodes in environments of lower illumination.

In another embodiment, the image sensor integrated circuit can be configured to read out the full frame or a subset of the full frame comprising a rectangular group of adjacent pixels. The read out analog signals can be amplified by the analog signal amplifier 1036 of FIG. 2. The analog signals can then be fed to the input of the ADC 1037 of FIG. 2. The resulting digital values representative of the analog signals can be stored in a system memory such as RAM 1080 of FIG. 2. Image frame data stored in RAM 1080 can be in the form of multibit pixel values, with each multibit pixel value representing light incident on a pixel of image sensor 1033 of FIG. 2. Then, the frame binning can be performed in the digital domain, by the CPU 1060 of FIG. 2 processing digital values representative of the read out analog signals.

In another embodiment, the CPU 1060 of FIG. 2 can be configured to produce a single digital value representative of a group of two or more pixels by averaging the digital values representative of the pixels sensitive in the green spectrum region. In an illustrative embodiment schematically shown in FIG. 3*a*, a Bayer pattern group 302 can be represented by a single monochrome pixel 304 by averaging two digital values $G_1$ and $G_2$ representative of two pixels sensitive in the green spectrum region: $P=(G_1+G_2)/2$. In a further aspect, in a method of N×N binning, the resulting monochrome pixels can be calculated as $P=(G_1+G_2+ \ldots G_N)/N$. In a further aspect, for M×N binning, the resulting monochrome pixels can be calculated as $P=(G_1+G_2+ \ldots G_K)/K$, wherein Gi are digital values of the pixels sensitive in the green spectrum region. The above described digital binning process can be repeated for all pixels composing an image frame, as schematically shown in FIG. 4*a*.

In a yet another embodiment, the CPU 1060 of FIG. 2 can be configured to produce a single digital value representative of a group of two or more pixels by summing the digital values representative of the pixels sensitive in the green spectrum region. In an illustrative embodiment schematically shown in FIG. 3*b*, a Bayer pattern group can be represented by a sum of digital values representative of two pixels sensitive in the green spectrum region, as schematically shown in FIG. 3*b*. According to the embodiment, a Bayer pattern group 306 can be represented by a single monochrome pixel 308 by summing two digital values $G_1$ and $G_2$ representative of two pixels sensitive in the green spectrum region: $P=(G_1+G_2)$. In a further aspect, in a method of N×N binning, the resulting monochrome pixels can be calculated as $P=G_1+G_2+ \ldots G_N$. The above described digital binning process can be repeated for all pixels composing an image frame, as schematically shown in FIG. 4*a*.

In a yet another embodiment, CPU 1060 of FIG. 2 can be configured to produce a single digital value representative of a group of two or more pixels by summing three digital values representative of light incident on three pixels sensitive, respectively, in red, green and blue spectrum regions. In an illustrative embodiment schematically shown in FIG. 3*c*, CPU 1060 of FIG. 2 can be configured to produce a single digital value representative of pixels composing a Bayer pattern group by summing three digital values representative of light incident on three pixels sensitive, respectively, in red, green and blue spectrum regions, as schematically shown in FIG. 3*c*. According to the embodiment, a Bayer pattern group 310 can be represented by a single monochrome pixel 312 by summing three digital values R, G, and B: $P=k_1*R+k_2*G+k_3*B$, wherein $k_1$, $k_2$, $k_3$ are the weight coefficients so that $k_1+k_2+k_3=1$. In a further aspect, for M×N binning, the resulting monochrome pixels can be calculated as $P=\Sigma k_1*R+\Sigma k_2*G+\Sigma k_3*B$ wherein each summing operation is performed for all pixels in the group which are sensitive in a given spectrum region. The above described digital binning process can be repeated for all pixels composing an image frame, as schematically shown in FIG. 4*a*.

In a yet another embodiment, the CPU 1060 of FIG. 2 can be configured to produce a single digital value representative of a group of two or more pixels equal to the digital value representative of the pixel sensitive in the red spectrum region. In an illustrative embodiment schematically shown in FIG. 3*d*, the CPU 1060 of FIG. 2 can be configured to produce a single digital value representative of pixels composing a Bayer pattern group equal to the digital value representative of the pixel sensitive in the red spectrum region, as schematically shown in FIG. 3*d*. According to the embodiment, a Bayer pattern group 314 can be represented by a single monochrome pixel 316 represented by a digital value equal to the digital value representative of the pixel sensitive in the red spectrum region: P=R. In a further aspect, for M×N binning, the resulting monochrome pixels can be calculated as $P=\Sigma k_1*R$ wherein the summing operation is performed for all pixels in the group which are sensitive in the red spectrum region. The above described digital binning process can be repeated for all pixels composing an image frame, as schematically shown in FIG. 4*a*.

Figure 3E:
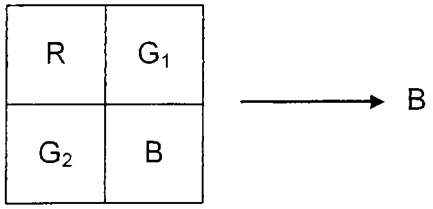
FIG. 3*e* schematically illustrates a method of 2×2 color by producing, in every Bayer pattern group, a signal representative of the pixel sensitive in the red spectrum region.

In a yet another embodiment, the CPU 1060 of FIG. 2 can be configured to produce a single digital value representative of a group of two or more pixels equal to the digital value representative of the pixel sensitive in the blue spectrum region. In an illustrative embodiment schematically shown in FIG. 3*e*, the CPU 1060 of FIG. 2 can be configured to produce a single digital value representative of pixels composing a Bayer pattern group equal to the digital value representative of the pixel sensitive in the blue spectrum region, as schematically shown in FIG. 3*e*. According to the embodiment, a Bayer pattern group 318 can be represented by a single monochrome pixel 320 represented by a digital value equal to the digital value representative of the pixel sensitive in the blue spectrum region: P=B. In a further aspect, for M×N binning, the resulting monochrome pixels can be calculated as $P=\Sigma k_1*B$ wherein the summing operation is performed for all pixels in the group which are sensitive in the blue spectrum region. The above described digital binning process can be repeated for all pixels composing an image frame, as schematically shown in FIG. 4*a*.

In a yet another embodiment, the CPU 1060 of FIG. 2 can be configured to produce a single digital value representative of a group of two or more pixels equal to the digital value representative of the N×M neighboring pixels, by sliding an N×M binning window over the array of pixels with the offset of one pixel at every step of the method. Thus, any two groups of N×M neighboring pixels used by the method can overlap by N*(M−1) pixels.

In an illustrative 2×2 binning embodiment schematically shown in FIG. 4*b*, the pixel value $P_{xy}$ at row=x and column=y can be produced as follows:

$$P_{xy}=(P_{xy},P_{x,y+1},P_{x+1,y},P_{x+1,y+})/4$$

According to the embodiment, a source color image 520 having a dimension of K×L pixels can be converted into a binned monochrome image 530 having a dimension of (K−1)×(L−1) pixels by sliding a 2×2 binning window over the array of pixels with the offset of one pixel at every step of the method. The above described digital 2×2 binning process can be repeated for all pixels composing an image frame, as schematically shown in FIG. 4*b*.

In a further aspect, for N×M binning, a source color image having a dimension of K×L pixels can be converted into a binned monochrome image having a dimension of (K−1)×(L−1) pixels by sliding a N×M binning window over the array of pixels with the offset of one pixel at every step of the method. Thus, in an illustrative N×M binning embodiment, the pixel value $P_{xy}$ at row=x and column=y can be produced as follows:

$$P_{xy}=(\Sigma P_{ij})/(N*M), \text{ wherein } i=x, \ldots, x+N-1, j=y, \ldots, y+M-1$$

The above described digital N×M binning process can be repeated for all pixels composing an image frame.

In a further aspect, the binned monochrome image having a dimension of (K−1)×(L−1) pixels can be further N×M binned to generate a resulting monochrome image having a dimension of (K−1)×(L−1)/(N*M).

A skilled artisan would appreciate the fact that other methods of producing a single digital value representative of a group of two or more pixels are within the scope of the invention.

In a further aspect, the resulting digitally binned frame can be a monochrome frame, which can be suitable for decoding for decodable indicia. In a further aspect, the resolution of the output frame after N×N binning can be equal to 1/N of the image sensor resolution. Hence, the frame readout rate with N×N analog binning can be 1/N of the full frame readout rate. In a further aspect, a binned frame features a reduced noise level and therefore a higher SNR than an unbinned frame. Thus, binning a color image frame can be advantageous for applications which do not require color information. For example, in decoding applications, a higher SNR provides a higher decode success rate and permits successful decodes in environments of lower illumination.

In another aspect, a binned frame can be based on image information corresponding to a block of pixel positions using a function other than simple summing or averaging. For example, indicia reading terminal 1000 can perform color to gray level binning utilizing white balance co-efficiencies to reduce the Moiré pattern effect. For example, binning process can be performed using the formula $A=Cr*a_0+Cg*(a_1+a_2)/2+Cb*a_3$, where Cr, Cg, and Cb are white balance coefficients. Such coefficients can be obtained locally or globally by e.g., white patch or gray world algorithm.

Figure 5:
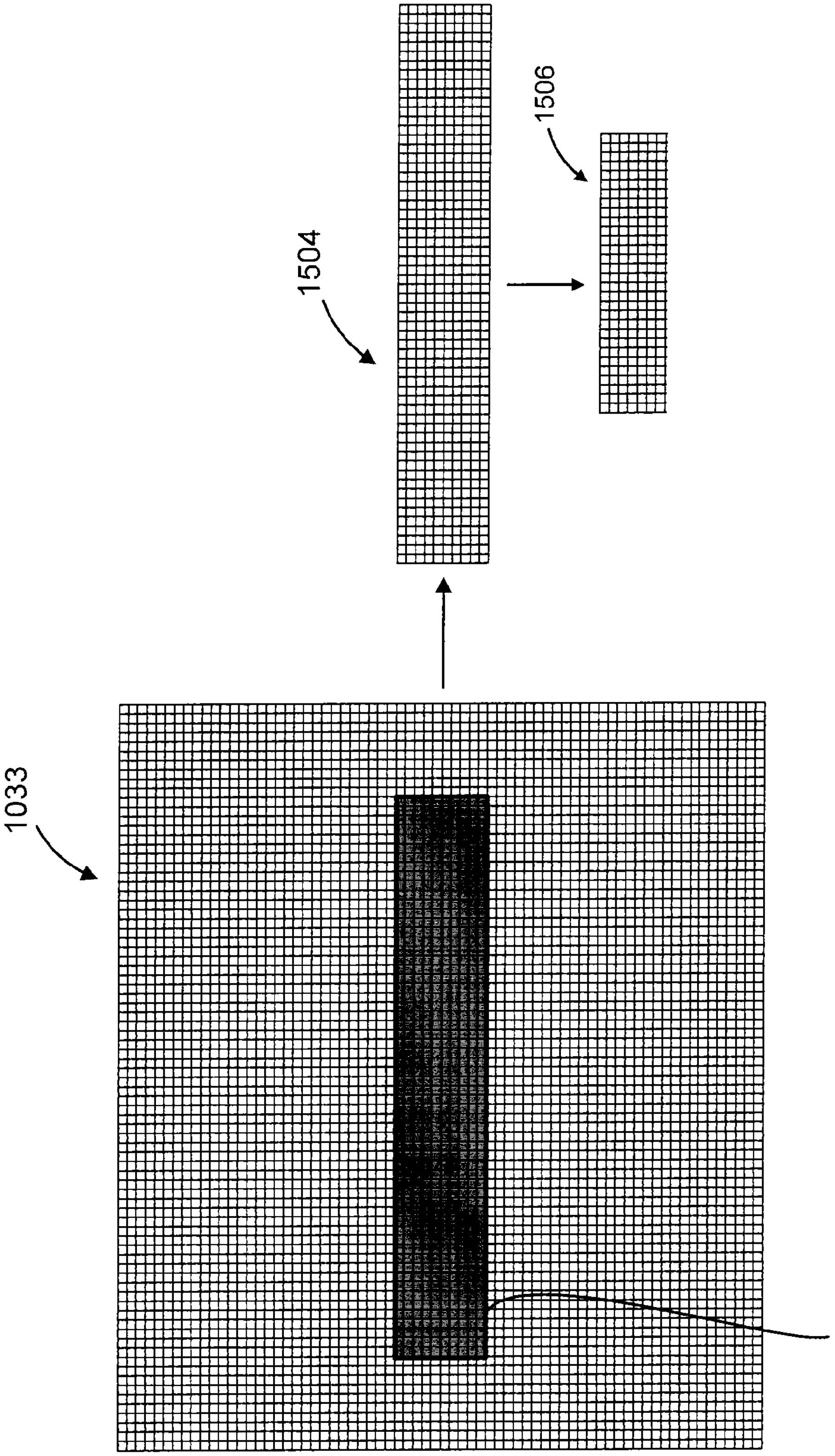
FIG. 5 is a diagram illustrating windowing operations that can be performed by an indicia reading terminal.

In another aspect, the indicia reading terminal 1000 can include windowing circuit 1029 incorporated as part of image sensor integrated circuit 1040. In response to commands received from CPU 1060 via circuit 1026 and timing control circuit 1038, windowing circuit 1029 can selectively address for read out a subset of pixels of image sensor 1033. A windowed frame is further described with references to FIG. 5. Image sensor 1033 can include a plurality of pixels arranged in a plurality of rows and columns of pixels as shown in FIG. 5. Terminal 1000 can be operated to read out a full frame of image data from image sensor 1033. When reading out a full frame, terminal 1000 can read out image data corresponding to all or substantially all pixels of image sensor 1033 (e.g., from 80% to 100% of image sensory array 1033). When reading out a windowed frame of image data, terminal

1000 can read out image information corresponding to a subset of pixels of image sensor 1033. In one example of a reading out of a windowed frame, terminal 1000 can read out image information corresponding to less than 80% of pixels of image sensor 1033. In another example of a reading out of a windowed frame, terminal 1000 can read out image information corresponding to less than 50% of pixels of image sensor 1033. In another example of a reading out of windowed frame, terminal can 1000 read out image information corresponding to less than ⅓ of the pixels of image sensor 1033. In another example of a reading out of windowed frame, terminal 1000 can read out image information corresponding to less than 25% of pixels of image sensor 1033. In another example of a reading out of windowed frame, terminal 1000 can read out image data corresponding to less than 10% of pixels of image sensor 1033.

A particular example of a windowed frame read out is described with reference to FIG. 5. A windowed frame can comprise a continuous group of positionally adjacent pixels. A continuous group of pixels can be provided where a group comprises each or essentially each pixel within a border defined by border pixels of a group. A group of pixels can also have a group of pixels including border pixels defining a border and skipped pixels within the border e.g., every other or every third pixel with the border can be skipped. Group of pixels 1502 in the example of FIG. 5 are pixels of image sensor 1033 that are selectively addressed for read out of a windowed frame. The group of pixels 1502 in the example of FIG. 5 is shown as including a continuous group of K×L, K>5, L>5 array of positionally adjacent pixels selectively addressed from image sensor 1033 having M×N pixels. A group of pixels for subjecting to read out of a windowed frame could also comprise a continuous group of K−1, L>5 array of pixels where the group of pixels are positionally adjacent such that each pixel position is positionally adjacent to at least one other pixel position of the group. Windowing circuit 1029 can be controlled to dynamically vary a window size between successive frames. It will be seen that a windowed frame at a certain terminal to target distance and lens setting can represent indicia within a defined area of a target substrate that is relatively smaller than a defined area within which indicia would be represented by a frame representing each pixel of image sensor 1033.

When a windowed frame of image information is read out and stored in a memory in the form of digital image data, an image representation is provided having a number of pixel positions that is reduced relative to that of an image representation corresponding to a full frame. Windowed frame of image data 1504 as illustrated in FIG. 5 can have a number of pixel positions corresponding to the number of pixels of group of pixels 1502 selectively addressed for read out of a windowed frame. As noted herein supra, image information read out from image sensor 1033 can be amplified by amplifier circuitry 1036 and then subject to conversion by analog to digital converter 1037 and then subject to storage into RAM 1080. Stored image data stored into RAM 1080 can be in the form of multibit pixel values. Windowed frame 1504 when stored in memory 1085 where it can be addressed for processing by CPU 1060 can comprise a plurality of pixel positions corresponding to the K×L array of pixels subject to selective addressing and selective read out, and each pixel position can have associated therewith a multibit pixel value representing light incident at the pixel having the corresponding pixel position of image sensor 1033.

Windowed frame 1504 can be captured in less time than a full frame. Accordingly, when terminal 1000 switches from capture of a full frame to a windowed frame, a frame rate can increase and a frame capture time can decrease. As the number of pixel positions is reduced relative to that of a full frame, a memory overhead bandwidth for storage of windowed frame 1504 can be reduced. Referring again to FIG. 5, it is seen that windowed frame 1504 can still be of sufficient size to include a complete representation of decodable indicia 15 where group of pixels 1502 is at a center of an image sensor as shown in FIG. 5, where indicia 15 is centered at a full frame field of view of terminal 1000 and where indicia 15 is at a sufficient distance from terminal 1000. With aiming pattern generator comprising elements 1208, 1209 adapted to project aiming pattern 70 at a horizontally extending centerline of a field of view 140, terminal 1000 can easily be located so that a portion of a field of view corresponding to group of pixels 1502 is centered on indicia 15.

In one embodiment, terminal 1000 can be configured to combine windowing and binning processes. Referring to FIG. 5, the frame 1506 can represent the result of 2×2 binning applied to the windowed frame 1504. In one embodiment, the windowed frame 1504 can be subjected to the analog binning process described herein supra. In another embodiment, the windowed frame 1504 can be subjected to the digital binning process described herein supra. The resulting frame 1506 has the resolution of ½ of the full frame resolution, thus further reducing the readout time and SNR as compared to both full frame 1033 and 1504.

Terminal 1000 can capture frames of image data at a rate known as a frame rate. A typical frame rate is 60 frames per second (FPS) which translates to a frame capture time (frame period) of 16.6 ms. Another typical frame rate is 30 frames per second (FPS) which translates to a frame capture time (frame period) of 33.3 ms per frame. A frame rate can increase (and frame time decrease) where a captured frame is a binned frame or a windowed frame.

Figure 6:
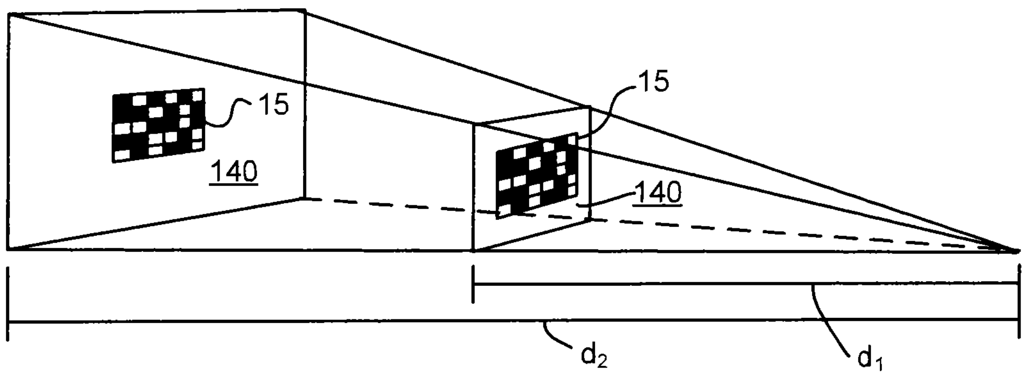
FIG. 6 is a diagram illustrating field of view size of an exemplary indicia reading terminal wherein a field of view encompasses a larger area of a target substrate at longer range terminal to target distances, and where a pixel/mil. (or pixel/inch) resolution of a representation of a same sized decodable indicia is lower at longer distances.

As shown in FIG. 6, a surface area encompassed by a field of view of the indicia reading terminal 1000 can expand at longer reading distances. Thus at a relatively shorter terminal to target distance, $d_1$, a decodable indicia 15 of a given physical size area will consume a larger portion of a field of view 140 as compared to field of view 140 at a relatively longer terminal to target distance, $d_2$. In one embodiment, terminal 1000 can be operative to process one or more of binned frames of image data and to capture windowed frames of image data. Binned frames can be particularly advantageous for use in decoding of decodable indicia at shorter range terminal to target distances. At relatively shorter terminal to target distances, pixel resolution is less significant a factor in determining decoding speed or likelihood of decoding. Also, as binned frames comprise a smaller number of pixel positions than unbinned frames representing the same area in physical space, binned frames reduce memory bandwidth overhead. On the other hand, use of windowed frames can be particularly useful for decoding of frames of image data at longer terminal to target distances. Windowed frames can be captured more rapidly than standard size frames. As frames captured at longer terminal to target distances can be expected to have a large amount of extraneous image data not representing a decodable indicia outside the area of the windowed frame, windowing at longer terminal to target distances can reduce image capture time without reducing a likelihood of a successful decode. Also, as windowed frames include fewer pixel values than full frames, windowed frames reduce memory bandwidth overhead.

Figure 8:
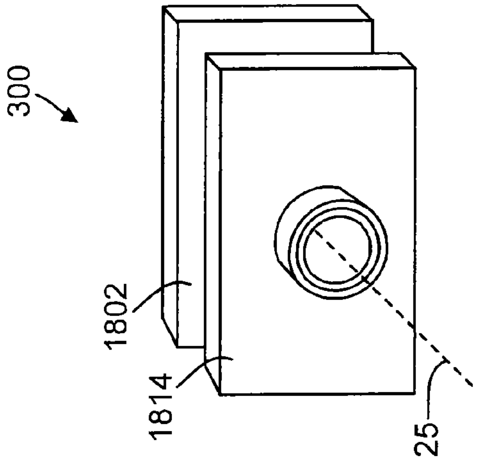
FIG. 8 is an assembled perspective view of the imaging module as shown in FIG. 7.
Figure 9:
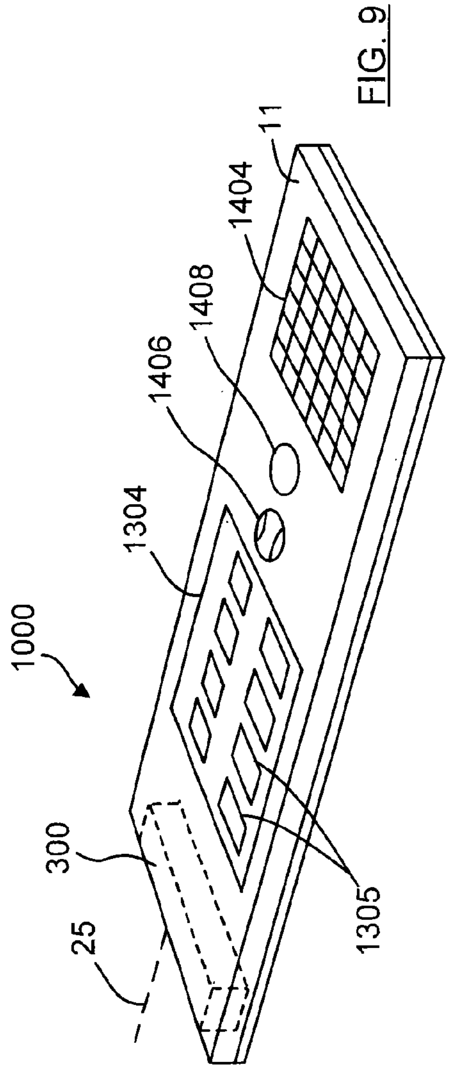
FIG. 9 is a perspective view of a hand held indicia reading terminal incorporating an imaging module as shown in FIGS. 7 and 8.

Referring to FIGS. 7 and 8, an imaging module 300 for supporting components of terminal 1000 can include image sensor integrated circuit 1040 disposed on a printed circuit board 1802 together with illumination pattern light source bank 1204 and aiming pattern light source bank 1208 each shown as being provided by a single light source. Imaging module 300 can also include containment 1806 for image sensor integrated circuit 1040, and housing 1810 for housing imaging lens 1110. Imaging module 300 can also include optical plate 1814 having optics for shaping light from bank 1204 and bank 1208 into predetermined patterns. Imaging module 300 can be disposed in a hand held housing 11, an example of which is shown in FIG. 9. Disposed on hand held housing 11 can be display 1304, trigger 1408, pointing device 1406, and keyboard 1404.

An example of an indicia reading terminal 1000 operating in accordance with described processing is described with reference to the timing diagram of FIG. 10. Referring to the timing diagram of FIG. 10, signal 502 is a trigger signal. Terminal 1000 can be operative so that trigger signal 502 is made active responsively to trigger 1408 being actuated and further so that trigger signal 502 remains active until the earlier of trigger 1408 being released or a predetermined number of a decodable indicia (e.g., 1) being successfully decoded and output. A decoded message corresponding to an encoded indicia that has been decoded can be output e.g., by storage of the message into a non-volatile memory, e.g., memory 1084 and/or display of the decoded message on display 1304 and/or transmitting the decoded message to an external CPU-equipped terminal e.g., a locally networked personal computer or a remote server. Exposure control signal 510 can be always active or else as in the embodiment shown in FIG. 10, terminal 1000 can be operative so that exposure control signal 510 is made active responsively to a trigger signal 502 being made active. During each exposure period e.g., period $e_0$, $e_1$, $e_2$ . . . pixels of image sensor 1033 can be exposed to light focused on image sensor 1033 by variable focus imaging lens 1110. Terminal 1000 can be operative so that after application of each exposure period $e_0$, $e_1$, $e_2$ . . . a readout control pulse can be applied to image sensor 1032 for readout of voltages corresponding to charges accumulated on pixels of image sensor 1033 during the preceding exposure period. A readout control signal 512 can comprise a series of readout control pulses as indicated in the timing diagram of FIG. 10. Subsequent to a readout control pulse, image information in the form of voltages can be amplified by amplifier circuitry 1036, converted into digital format by analog to digital converter 1037, and the converted image data can be routed by DMA unit 1070 for storage into memory 1080 which can be addressable by CPU 1060. It is seen from the timing diagram of FIG. 10 that subsequent to activation of trigger signal 502 a succession of frames can be successively stored into memory 1080 where the frames are addressable for processing by CPU 1060. Terminal 1000 can be operative so that memory 1080 buffers a limited and predetermined number of frames successfully stored therein, and discards old frames after storage of a predetermined number of succeeding frames.

Referring to further aspects of an exemplary indicia reading terminal, time plot 514 illustrates focus adjustment periods of variable focus imaging lens 1110. It has been described that variable focus imaging lens 1110 can have multiple focus positions. In one example, variable focus imaging lens 1110 can have a shorter range focus position defining a plane of optical focus at first shorter terminal to target distance, a longer range focus position defining a plane of optical focus at a distance longer than the shorter range focus distance and can have an intermediate range focus distance being a focus distance between the shorter and the longer focus distance. In various embodiments, it can be advantageous to vary a focus distance of variable focus imaging lens 1110. In the example described with reference to the timing diagram of FIG. 9, a focus distance of variable focus imaging lens 1110 can be varied during a time that trigger signal 502 remains active. In an aspect illustrated with reference to FIG. 10, adjustment periods, e.g., periods $m_0$, $m_1$, $m_2$ . . . are coordinated with exposure periods of image sensor 1033. With reference to the timing diagram of FIG. 10, adjustment periods $m_0$, $m_1$, $m_2$ . . . of variable focus imaging lens 1110 can be timed to coincide with periods that are intermediate of exposure periods e.g., $e_0$, $e_1$, $e_2$ . . . in such manner that exposure is avoided during times at which focus and possibly focal length characteristics of variable focus imaging lens 1110 are in a changing state. Frames exposed during an adjustment period can be expected to be blurred or otherwise disregarded. Accordingly, avoiding exposure during such periods can be advantageous. In the example of FIG. 10, variable focus imaging lens 1110 is subject to adjustment intermediate every exposure period during an activation period of trigger signal 502. However, it is understood that a focus position and a fixed length of variable focus imaging lens 1110 can remain constant through a succession of exposure periods. Variable focus imaging lens 1110 can be selected to be of a type in which focus position and focal length can be changed within a short time period, e.g., less than 10 ms. Where variable focus imaging lens 1110 is a deformable lens, adjustment of optical properties of the lens (e.g. focal length and therefore focal distance) can result from force being applied to the surface of the lens to change a concavity thereof. Where variable focus imaging lens 1110 is a liquid crystal lens, an adjustment of variable focus imaging lens 1110 can result from applying an electrical signal to variable focus imaging lens 1110 to change indices of refraction of the lens and therefore the focal length and focal distance of the lens.

Figure 10:
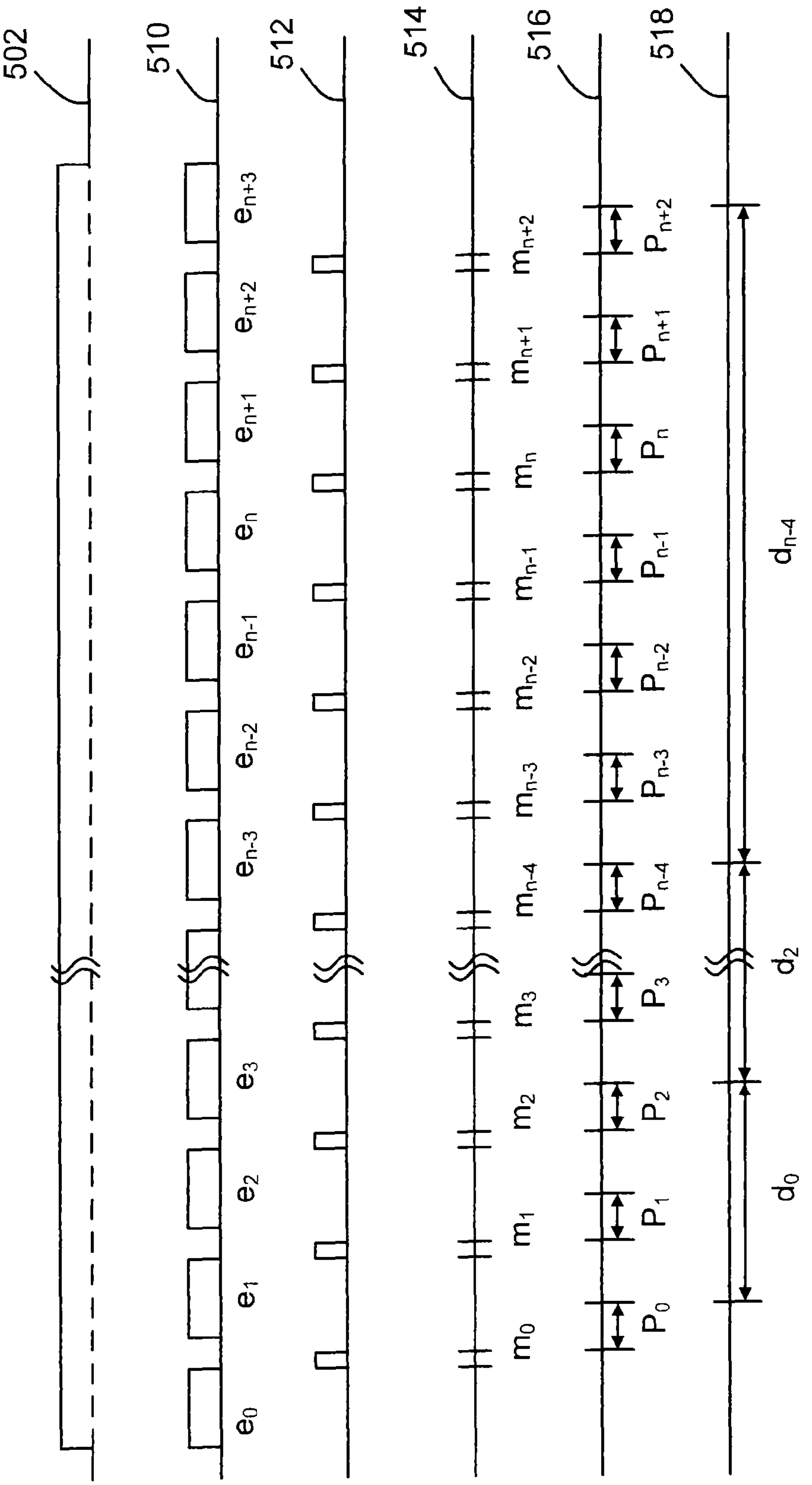
FIG. 10 is a timing diagram illustrating a timing of various operations that can be carried out by an indicia reading terminal.

Referring to the time plots 516 and 518 of the timing diagram of FIG. 10, CPU 1060 can subject each frame of a succession of frames to preliminary processing and can subject a subset of the succession of frames to decoding processing for attempting to decode a frame of image data. Time plot 516 illustrates times for preliminary processing of frames for CPU 1060.

During preliminary processing periods $p_0$, $p_1$, $p_2$ . . . CPU 1060 can preliminarily evaluate each frame of a succession of frames. Such preliminary processing can include e.g., detecting a quality of a frame based on average white level or a quality of a frame based on another criteria, incidence in sharpness of edges. Based on the result of the preliminary processing a subset of frames of a succession of frames can be subject to decoding processing for attempting to decode a decodable indicia represented in a frame. In the particular example of the timing diagram of FIG. 10, CPU 1060 can subject an initial frame, frame=$\text{frame}_0$ to decoding processing for period $d_0$, can switch to decoding processing of frame=$\text{frame}_2$ during period $d_2$, and can switch to decoding processing of frame=$\text{frame}_4$ during period $d_4$. In the timing diagram of FIG. 10, the subscript indicates the frame number, e.g., exposure period $e_{n-1}$ indicates the exposure period for frame=frame $e_{n-1}$, processing period $p_1$ indicates a preliminary processing for frame=$\text{frame}_1$ of a succession of frames, and decoding period, $d_2$, indicates a decoding processing period for frame=$\text{frame}_2$ and so on. Terminal 1000 can be operative so that preliminary processing periods $p_0$, $p_1$, $p_2$ . . . are restricted from consuming more than a predetermined time period, e.g., more than a predetermined fraction of time. In one embodiment, preliminary processing periods $p_0$, $p_1$, $p_2$ . . . can be restricted from consuming a time period of more than one half of a frame time, i.e., more than 8.3 ms where a frame time is 16.6 ms.

As noted herein supra, the indicia reading terminal 1000 can bin frames of image data either in the analog domain by activation of binning circuit 1028, or in the digital domain, e.g., by CPU 1060 by way of processing of a stored frame. Where operative to bin frames in the digital domain by processing of a frame of image data stored in memory 1085, CPU 1060 can be operative to provide a binned frame either as part of a preliminary processing of a frame during a period such as period $p_0$, $p_1$, $p_2$ . . . or as part of a decoding process such as during period $d_0$, $d_1$, $d_2$ . . . .

In another aspect, the processes of binning, windowing and focus control by the indicia reading terminal 1000 can be controlled in a coordinated manner for enhanced performance of the terminal 1000.

Various possible configurations of terminal 1000 are described with reference to Table A. Terminal 1000 can be operative so that any one of the listed configurations can be made active by operator selection of a displayed button 1305 corresponding to the configuration. Terminal 1000 can be operative to display one button 1305 corresponding to each possible configuration. Table A describes aspects of frames subject to processing during a time that trigger signal 502 remains active according to each of several different configurations.

TABLE A

| | FRAMES | | | | | |
|---|---|---|---|---|---|---|
| CONFIGURATION | $Frame_0$ | $Frame_1$ | $Frame_2$ | $Frame_3$ | $FRAME_4$ | $FRAME_5$ |
| A | Focus Intermediate Frame Type Normal | Focus Intermediate Frame Type Normal | Focus Intermediate Frame Type Normal | Focus Intermediate Frame Type Normal | Focus Intermediate Frame Type Normal | Focus Intermediate Frame Type Normal |
| B | Focus Intermediate Frame Type Normal | Focus Intermediate Frame Type Normal | Focus Intermediate Frame Type Normal | Focus Intermediate Frame Type Normal | Focus Intermediate Frame Type Normal | Focus Intermediate Frame Type Normal |
| C | Focus Intermediate Frame Type Normal | Focus Intermediate Frame Type Normal | Focus Intermediate Frame Type Normal | Focus Intermediate Frame Type Normal | Focus Intermediate Frame Type Normal | Focus Longer Frame Type Windowed |
| D | Focus Intermediate Frame Type Normal | Focus Shorter Frame Type Binned | Focus Intermediate Frame Type Normal | Focus Longer Frame Type Windowed | Focus Intermediate Frame Type Normal | Focus Shorter Frame Type Binned |
| E | Focus Shorter Frame Type Binned | Focus Longer Frame Type Windowed | Focus Shorter Frame Type Binned | Focus Longer Frame Type Windowed | Focus Shorter Frame Type Binned | Focus Longer Frame Type Windowed |
| F | Focus Shorter Frame Type Binned | Focus Shorter Frame Type Binned | Focus Shorter Frame Type Binned | Focus Longer Frame Type Windowed | Focus Longer Frame Type Windowed | Focus Longer Frame Type Windowed |
| G | Focus Longer Frame Type Normal | Focus Longer Frame Type Normal | Focus Longer Frame Type Normal | | | |
| H | Focus Shorter Frame Type Binned | Focus Shorter Frame Type Binned | Focus Shorter Frame Type Binned | Focus Shorter Frame Type Binned | Focus Shorter Frame Type Binned | Focus Shorter Frame Type Binned |
| I | Focus Even Shorter Frame Type 4 × 4 Binned | Focus Shorter Frame Type 2 × 2 Binned | Focus Intermediate Frame Type Normal | Focus Longer Frame Type 2592 × 512 Window | Focus Even Longer Frame Type 1000 × 200 Window | Focus Longer Frame Type 2592 × 512 Window |

| | FRAMES | | | | |
|---|---|---|---|---|---|
| CONFIGURATION | $Frame_6$ | $Frame_7$ | $Frame_8$ | $Frame_9$ | . . . |
| A | Focus Intermediate Frame Type Binned | Focus Intermediate Frame Type Binned | Focus Intermediate Frame Type Binned | Focus Intermediate Frame Type Binned | . . . . . . |
| B | Focus Intermediate Frame Type Normal | Focus Shorter Frame Type Binned | Focus Shorter Frame Type Binned | Focus Shorter Frame Type Binned | . . . . . . |
| C | Focus Longer Frame Type Windowed | Focus Longer Frame Type Windowed | Focus Longer Frame Type Windowed | Focus Longer Frame Type Windowed | . . . . . . |
| D | Focus Intermediate Frame Type Normal | Focus Longer Frame Type Windowed | Focus Intermediate Frame Type Normal | Focus Shorter Frame Type Binned | . . . . . . |

TABLE A-continued

| | | | | | |
|---|---|---|---|---|---|
| E | Focus<br>Shorter<br>Frame Type<br>Binned | Focus<br>Longer<br>Frame Type<br>Windowed | Focus<br>Shorter<br>Frame Type<br>Binned | Focus<br>Longer<br>Frame Type<br>Windowed | |
| F | Focus<br>Shorter<br>Frame Type<br>Binned | Focus<br>Shorter<br>Frame Type<br>Binned | Focus<br>Shorter<br>Frame Type<br>Binned | Focus<br>Longer<br>Frame Type<br>Windowed | . . .<br><br>. . . |
| G | | | | | |
| H | Focus<br>Shorter<br>Frame Type<br>Binned | Focus<br>Shorter<br>Frame Type<br>Binned | Focus<br>Shorter<br>Frame Type<br>Binned | Focus<br>Shorter<br>Frame Type<br>Binned | . . .<br><br>. . . |
| I | Focus<br>Intermediate<br>Frame Type<br>Normal | Focus<br>Shorter<br>Frame Type<br>2 × 2 Binned | Focus<br>Even Shorter<br>Frame Type<br>4 × 4 Binned | Focus<br>Shorter<br>Frame Type<br>2 × 2 Binned | |

When configuration A is active, terminal 1000 is operative to capture and process a succession of normal frames until a predetermined condition is satisfied, and then switch to processing of one or more binned frames. The term "normal frame" in reference to Table A refers to a frame that is neither binned nor windowed. A binned frame which may be provided by way of analog or digital binning explained herein supra. The predetermined condition can be e.g., a time out condition (e.g., decoding not being successful for a predetermined time from a time of trigger signal actuation). The predetermined condition can also be e.g., a sensed terminal to target distance or that the quality of a frame satisfies a predetermined criteria as measured by e.g., the summation of absolute values of the first derivative of a set of sample values at selected sampling areas of a frame. Terminal 1000 can be operative to sense a terminal to target distance utilizing an average white level of a frame of image data. Terminal 1000 can determine that the terminal is at a relatively shorter terminal to target distance when an average white level of a frame is above a predetermined threshold. The focus setting when configuration A is active does not change from frame to frame. Thus terminal 1000 can be operative in accordance with configuration A, even where imaging lens 1110 is not a variable focus lens but a fixed lens provided by a fixed focus imaging lens, devoid of a capacity to vary its defined focus distance or focal length. A binned frame can be captured at higher speeds than an unbinned frame. Hence, selection of configuration A and all configurations described herein featuring binned frames can speed up decoding operations.

Regarding configuration B, configuration B is like configuration A, except that in accordance with configuration B a switch to processing of a binned frame is timed with a certain focus setting of variable focus imaging lens 1110. In configuration B, binning of frames can be conditionally carried out in response to satisfaction of one of the predetermined criteria as explained in connection with configuration A. However, in accordance with configuration A, a change in focus setting can result from a predetermined criteria being satisfied. In configuration B, terminal 1000 can be operative so that during an exposure period of a binned frame (which can be binned before or after being subject to storage) the variable focus imaging lens 1110 is set to a shorter focus setting. Thus, in the case the target indicia is in fact disposed at the shorter focus distance, the likelihood of a successful decode will increase first by the sharp focus of a resulting frame and second by a higher SNR brought about by the binning of the frame, where binning is provided by averaging imaging information values associated with a block of pixel positions.

When in configuration C, terminal 1000 in response to a trigger signal 502 being made active, can capture and process a plurality of normal frames and then switch during the activation period of signal 502 to capture windowed frames in response to a predetermined criteria. As noted, the windowed frames can be captured at higher speed; hence selection of configuration C and all configurations described featuring windowed frames speeds up decoding operations. The predetermined criteria can be e.g., that decoding is not successful within a predetermined time within the time period of trigger signal activation or that the terminal is at a relatively longer distance from a target (which can be indicated e.g., by an average white level of a prior frame being below a predetermined threshold) or that the quality of a frame satisfies a predetermined criteria as measured by e.g., the summation of absolute values of the first derivative of a set of sample values at selected sampling areas of a frame.

In configuration D, both the focus of variable focus imaging lens 1110 and the type of frame (binned, normal, windowed) switch between successive frames. The binning of frames can be synchronized to the setting of the variable focus imaging lens at a shorter focus setting (terminal 1000 can be controlled so that during an exposure period of a binned frame the imaging lens is set to a shorter focus setting). The capture of normal unbinned full frames can be synchronized to an intermediate focus setting (terminal 1000 can be controlled so that during an exposure period of a normal frame, the variable focus imaging lens is set to an intermediate focus setting). The capture of windowed frames can be synchronized with the setting of a variable focus imaging lens 1110 at a longer range focus setting (terminal 1000 can be controlled so that during an exposure period of a windowed frame the image lens is set to a longer focus setting).

Referring to operation in accordance with configuration E, operation in accordance with configuration E active is like operation with configuration D active except the frame characteristics switch between binned and windowed frames with no normal (unbinned, unwindowed) frames being captured. Accordingly, each frame captured with trigger signal 502 and configuration E active can be captured at a faster frame time relative to that of an unbinned frame and can have reduced memory overhead bandwidth relative to that of a normal frame.

In the embodiment of configurations D and E, the switching between binned, normal (configuration D), and windowed frames, each synchronized with a setting of variable focus imaging lens 1110 at a certain lens setting for each frame type, can be made according to an open loop operation, where the switching is made without the switching being conditional on a predetermined condition being satisfied (e.g., a terminal to target distance, an elapsed decode type). However, in a variation of configurations D and E, terminal 1000 is operative so that the switching between frame types (each synchronized with a specific lens setting) is conditional on a predetermined condition being satisfied (e.g., an elapsed decode time threshold being satisfied or a predetermined terminal to target distance being satisfied).

Referring to configuration F, the operation of terminal 1000 in accordance with configuration F is similar to its operation in accordance with configuration E, except that the focus setting and frame type do not switch for each successive frame. Instead, the focus setting and frame type (binned, windowed) remain constant for a predetermined number (3 in the described example) and then switch to a new focus setting and frame time. In configuration F, like configuration E, each frame is either a binned frame or a windowed frame. Accordingly, each frame captured with configuration F active can be captured with a faster frame time than a frame time of an unbinned full frame. The windowed frames in the examples of configurations C, D, E, and F can be windowed frames having image data corresponding to (representing light incident at) a continuous group of pixels of sufficient size so that image data of the windowed frames can represent a complete decoded indicia (but since decoding as will be described can be accomplished by associating code words for certain symbols given, need not represent a complete indicia for decoding to be successful). In one example, the windowed frames can be image data representing light incident at a continuous 2592×512 group of pixels centered at a center of image sensor 1032 when image sensor 1032 has 2592×1944 total pixels.

Activation of configuration G in Table A can be regarded as activation of a picture taking mode of operation. When operating in a picture taking mode of operation, terminal 1000 in response to activation of trigger signal 502 can capture and can output a color frame of image data. For output of a color frame of image data, terminal 1000 can write a color frame to display 1304 and/or write the frame to non-volatile memory 1084. For output of a color frame, terminal 1000 alternatively or in addition to can transmit the frame via I/O interface 1604, 1608 to an external CPU-based terminal (e.g., a remote server, a local personal computer).

In the example of configuration G, terminal 1000, in response to activation of a trigger signal 502 with configuration G active can capture a limited predetermined number of frames (three in the particular example). CPU 1060 can average the three frames for noise reduction prior to outputting the resulting noise reduced frame as the frame output during operation in a picture taking mode. Decoding processing as described in connection with periods as described in connection with the timing diagram of FIG. 10 can be avoided (indicia decoding module 40 disabled) when terminal 1000 operates in a picture taking mode. Indicia decoding module 40 can also be enabled with configuration G active, and can be enabled with all other configurations of Table A so that a subset of frames captured during an activation period are subject to a decode attempt.

As indicated in Table A, terminal 1000, when a picture taking mode is active, can set a focus setting of variable focus imaging lens 1110 to a longer range focus setting (such that the imaging lens is set to the longer focus setting during the exposure period for each frame) given the expectancy that most pictures taken with the mode active will be taken at long range.

Referring now to configuration H, terminal 1000 with configuration H active, can bin (prior to or after a filter capture) each captured frame captured when trigger signal 502 is active. Thus, each frame captured (capture complete by storage into memory 1085) can be converted from a color frame to a monochrome frame such that it is in a form that is processable with use of a known decoding algorithm adapted for use with a monochrome frame. During the exposure period for each binned frame, imaging lens 1110 can be set to a shorter focus setting so that the likelihood of successfully decoding a decodable indicia by processing a frame captured at short range is increased.

As is indicated by configuration I, the block size of a block of pixel positions subject to binning can be a variable block size. Further, terminal 1000 can be operative so that the binning block size is synchronized with and varies with the lens setting of variable focus imaging lens 1110. In the example of configuration I, terminal 1000 can be capable of 4×4 block binning and can have an "even shorter" focus position relatively shorter than the focus position referred to as "shorter." In such an embodiment, exposure of a 4×4 block frame can be synchronized with the even shorter focus distance setting in the manner of synchronization described herein. Such an adjustment of the focus position can follow the pattern summarized in Table A. Also in accordance with the configuration I, terminal 1000 can be capable of windowing at variable window sizes and can have an "even longer" focus position that is relatively longer than the focus position designated as "longer." Terminal 1000 in the specific window can be capable of capture of a 2952×512 windowed frame corresponding to continuous 2952×512 group of pixels at a center of array 1033 as well as a smaller 1000×200 windowed frame corresponding to continuous 2952×512 group of pixels at a center of array 1033. According to the frame capture and image focus adjustment pattern, terminal 1000 can adjust a frame setting to "even longer" after exposure at a "longer" focus position and can expose a smaller windowed frame when the lens setting is the "even longer" focus setting, the exposure period and lens setting being synchronized in the manner described herein. The variable binning size and variable windowing size shown in configuration I can be implemented as part of a trial and error image capture scheme wherein terminal 1000 captures a plurality of frames for processing according to an open loop operation without detecting a sensed terminal to target distance or any other predetermined criteria. A variable bin size and/or a variable windowing size scheme can also be implemented as part of a detected predetermined criteria scheme as explained in connection with configurations B and C wherein terminal 1000 can activate binning module 10 (configuration B) or windowing module 20 (configuration C) in response to a detected criteria (e.g., a terminal to target distance, a decode time). It was also described with reference to various configurations that a focus setting can be coordinated with activation of binning module 10 and windowing module 20 (e.g., activation of binning module 10 can be synchronized with a setting of imaging lens 1110 at a shorter focus setting, and activation of windowing module 20 can be synchronized with a setting of imaging lens 1110 at a longer focus setting). It will be seen that terminal 1000 can be adapted to vary a bin size responsively to a detected terminal to target distance and to associate a certain bin size for a certain terminal to target distance to a synchronized certain focus setting. Terminal 1000 can also vary a window size responsive to a detected terminal to target distance and to associate a certain window size for a certain terminal to target distance to a synchronized certain focus setting. Also, terminal 1000 can be adapted so that no matter the method for detecting the bin size or window size, the established bin size or window size can be associated with a synchronized certain focus setting. Also, terminal 1000 can be adapted so that without any detecting method for detecting a sensed condition the terminal according to an open loop operation, can establish a bin size or window size to be associated with a synchronized certain focus setting.

Referring now to the indicia decoding process processes that can be carried out by the indicia decoding terminal 1000 during, e.g., periods $d_0$, $d_2$, $d_{n-4}$ of FIG. 10, CPU 1060 can be programmed to carry out a decoding process for attempting to decode a frame of image data. For attempting to decode a frame of image data, CPU 1060 can sample image data of a captured frame of image data along a sampling path, e.g., at a center of a frame, or a coordinate location determined to include a decodable indicia representation. In one example, a sampling path selected for executing a decode attempt can be a sampling path which for a previous frame was determined to intersect a decodable indicia representation. Next, CPU 1060 can perform a second derivative edge detection to detect edges. After completing edge detection, CPU 1060 can determine data indicating widths between edges. CPU 1060 can then search for start/stop character element sequences and if found, derive element sequence characters, character by character by comparing with a character set table. For certain symbologies, CPU 1060 can also perform a checksum computation. If CPU 1060 successfully determines all characters between a start/stop character sequence and successfully calculates a checksum (if applicable), CPU 1060 can output a decoded message.

Where a decodable indicia representation is a 2D bar code symbology, a decode attempt can comprise the steps of locating a finder pattern using a feature detection algorithm, locating scan lines intersecting the finder pattern according to a predetermined relationship with the finder pattern, determining a pattern of dark and light cells along the scan lines, and converting each light pattern into a character or character string via table lookup. In one example, terminal 1000 can be adapted so that CPU 1060 subjects each frame captured during a time that a trigger signal remains active to a decode attempt (e.g., frame=frame0, frame1, frame2 . . . in any of the configurations described with reference to Table A). In an alternative example, as has been described herein, terminal 1000 can be adapted so that CPU 1060 subjects only a subset of frames to a decode attempt, and selects frames for subjecting to decoding according to a predetermined criteria.

It should be noted that when switching to decoding a new frame (i.e., the switch from frame=$frame_0$ during period $d_0$ to frame=$frame_2$ during period $d_2$) terminal 1000 may not discard the results of decoding the previous frame. For example, in some instances, a decodable indicia subject to decoding can be a bar code of a symbology type that can be decodable to output code words. Code words of a bar code symbol are not complete decoded messages of a bar code symbol but can be combined with other code words of a bar code symbol to provide a complete decoded message. A decoded code word of a bar code symbol may be regarded as a partially decoded message. Symbologies which may be decoded to provide code words representing a partial decoded message of a bar code symbol include PDF 417, UPC, Datamatrix, QR code, and Aztec, etc. Terminal 1000 can be operative to accumulate partially decoded messages determined by processing a set of subject frames until a decoded message for a symbol is determined. For decoding bar code decodable indicia of certain symbologies, CPU 1060 can be adapted to combine partial decoded out results determined from two or more different frames. A partial decode result provided by decoding a frame of image data can take the form of a set of code words. CPU 1060 can be adapted to determine a first set of code words by processing a certain frame of a set of frames while a trigger signal 502 is active and to combine the first set of code words with a second set of code words determined by processing of a subsequent frame while the trigger signal 502 remains active. In one embodiment, CPU 1060 can be adapted so that CPU 1060 can process a certain frame to determine a first set of code words, a subsequent frame to provide a second set of code words, and possibly M further subsequent frames to provide a third set of code words. CPU 1060 can further be adapted to combine the first, second, and possible M additional sets of code words to provide a decoded message. For example, with reference to the timing diagram of FIG. 10, CPU 1060 may process frame=$frame_0$ to determine a first set of code words and then process frame=$frame_2$ to determine a second set of code words and then combine the code words to provide a decoded message output after the expiration of period $d_{n-4}$.

A small sample of systems methods and apparatus that are described herein is as follows:

A1. An indicia reading terminal comprising:

an image sensor integrated circuit having a two-dimensional image sensor, said two-dimensional image sensor including a plurality of pixels arranged in repetitive patterns, each pattern of said repetitive patterns including at least one pixel sensitive in a first spectrum region, at least one pixel sensitive in a second spectrum region, and at least one pixel sensitive in a third spectrum region;

a hand held housing encapsulating said two-dimensional image sensor;

an imaging lens configured to focus an image of a target decodable indicia onto said two-dimensional image sensor;

wherein said image sensor integrated circuit is configured to capture a frame of image data by reading out a plurality of analog signals, each analog signal of said plurality of analog signals being representative of light incident on a group of two or more pixels of said plurality of pixels;

wherein said group of two or more pixels includes one of: a pixel sensitive in said first spectrum region and a pixel sensitive in said third spectrum region, two pixels sensitive in said second spectrum region, a pixel sensitive in said first spectrum region and a pixel sensitive in said second spectrum region, a pixel sensitive in said second spectrum region and a pixel sensitive in said third spectrum region;

wherein said image sensor integrated circuit is further configured to convert said plurality of analog signals to a plurality of digital signals and to store said plurality of digital signals in a memory; and wherein said indicia reading terminal is operative to process said frame of image data for attempting to decode for decodable indicia.

A2. The indicia reading terminal of A1, wherein said first spectrum region is provided by a red spectrum region, said second spectrum region is provided by a green spectrum region, and said third spectrum region is provided by a blue spectrum region.

A3. The indicia reading terminal of A1, wherein said group of two or more pixels is provided by a group of four pixels including a pixel sensitive in said first spectrum region, two pixels sensitive in said second spectrum region, and a pixel sensitive in said third spectrum region.

A4. The indicia reading terminal of A1, wherein said group of two or more pixels is provided by a group of N adjacent pixels, wherein N is a positive integer.

A5. The indicia reading terminal of A1, wherein said group of two or more pixels is provided by a group of N×N adjacent pixels, wherein N is a positive integer.

A6. The indicia reading terminal of A1, wherein said group of two or more pixels is provided by a group of M×N adjacent pixels, wherein M and N are positive integers.

A7. The indicia reading terminal of A1, wherein said each analog signal is equal to one of: a sum of analog signals representative of light incident on one or more pixels of said group of pixels, an average of analog signals representative of light incident one or more pixels of said group of pixels.

A8. The indicia reading terminal of A1, wherein said each analog signal is equal to one of: a sum of analog signals representative of light incident on one or more pixels of said group of pixels, said one or more pixels being sensitive in one spectrum region, an average of analog signals representative of light incident on one or more pixels of said group of pixels, said one or more pixels being sensitive in one spectrum region.

A9. The indicia reading terminal of A1, wherein said group of two or more pixels is provided by a group of four pixels including a pixel sensitive in said first spectrum region, two pixels sensitive in said second spectrum region, and a pixel sensitive in said third spectrum region; and wherein said each analog signal is equal to one of: an average of analog signals representative of light incident on said two pixels sensitive in said second spectrum region, a sum of analog signals representative of light incident on said two pixels sensitive in said second spectrum region, an analog signal representative of brightness of light incident on a pixel sensitive in one of: said first spectrum region, said third spectrum region.

A10. The indicia reading terminal of A1, wherein said plurality of analog signals comprises at least two groups of N×M pixels; and wherein said at least two groups of two or more pixels overlap by N*(M−1) pixels.

A11. The indicia reading terminal of A1, including a color pattern filter disposed over said image sensor.

A12. The indicia reading terminal of A1, wherein said frame of image data is a monochrome frame.

A13. The indicia reading terminal of A1, wherein said plurality of analog signals represents substantially all pixels of said image sensor.

A14. The indicia reading terminal of A1, wherein said plurality of analog signals represents a subset of pixels of said image sensor.

A15. The indicia reading terminal of A1, wherein said plurality of analog signals represents substantially all pixels of said image sensor if a resolution of said frame of image data is sufficient to decode said target decodable indicia; and wherein said plurality of analog signals represents a subset of pixels of said image sensor if said resolution of said frame of image data is insufficient to decode said target decodable indicia.

A16. The indicia reading terminal of A1, wherein said plurality of analog signals represents a group of adjacent pixels centered at a center of said image sensor.

A17. The indicia reading terminal of A1, wherein said group of two or more pixels is provided by a group of two or more pixels sensitive in one spectrum region.

B1. An indicia reading terminal comprising:

an image sensor integrated circuit having a two-dimensional image sensor, said two-dimensional image sensor including a plurality of pixels arranged in repetitive patterns, each pattern of said repetitive patterns including at least one pixel sensitive in a first spectrum region, at least one pixel sensitive in a second spectrum region, and at least one pixel sensitive in a third spectrum region;

a hand held housing encapsulating said two-dimensional image sensor;

an imaging lens configured to focus an image of a target decodable indicia onto said two-dimensional image sensor;

wherein said image sensor integrated circuit is configured to capture a frame of image data by reading out a plurality of analog signals, each analog signal of said plurality of analog signals being representative of light incident on a pixel of said plurality of pixels;

wherein said image sensor integrated circuit is further configured to convert said plurality of analog signals to a plurality of digital signals and to store said plurality of digital signals in a memory;

wherein said indicia reading terminal is configured to convert digital signals representative of pixel values of a group of two or more pixels into a single digital pixel value;

wherein said group of two or more pixels includes one of: a pixel sensitive in said first spectrum region and a pixel sensitive in said third spectrum region, two pixels sensitive in said second spectrum region, a pixel sensitive in said first spectrum region and a pixel sensitive in said second spectrum region, a pixel sensitive in said second spectrum region and a pixel sensitive in said third spectrum region; and wherein said indicia reading terminal is further configured to process said frame of image data for attempting to decode for decodable indicia B2. The indicia reading terminal of B1, wherein said first spectrum region is provided by a red spectrum region, said second spectrum region is provided by a green spectrum region, and said third spectrum region is provided by a blue spectrum region.

B3. The indicia reading terminal of B1, wherein said group of two or more pixels is provided by a group of four pixels including a pixel sensitive in said first spectrum region, two pixels sensitive in said second spectrum region, and a pixel sensitive in said third spectrum region.

B4. The indicia reading terminal of B1, wherein said group of two or more pixels is provided by a group of N adjacent pixels, wherein N is a positive integer.

B5. The indicia reading terminal of B1, wherein said group of two or more pixels is provided by a group of N×N adjacent pixels, wherein N is a positive integer.

B6. The indicia reading terminal of B1, wherein said group of two or more pixels is provided by a group of M×N adjacent pixels, wherein M and N are positive integers.

B7. The indicia reading terminal of B1, wherein said single digital pixel value is equal to one of: a sum of digital pixel values of one or more pixels of said group of pixels, an average of digital pixel values of one or more pixels of said group of pixels.

B8. The indicia reading terminal of B1, wherein said single digital pixel value is equal to one of: a sum of digital pixel values of one or more pixels of said group of pixels, said one or more pixels being sensitive in one spectrum region, an average of digital pixel values of one or more pixels of said group of pixels, said one or more pixels being sensitive in one spectrum region.

B9. The indicia reading terminal of B1, wherein said group of two or more pixels is provided by a group of four pixels including a pixel sensitive in said first spectrum region, two pixels sensitive in said second spectrum region, and a pixel sensitive in said third spectrum region; and wherein said single digital pixel value is equal to one of: an average of digital pixel values of said two pixels sensitive in said second spectrum region, a sum of digital pixel values of said two pixels sensitive in said second spectrum region, a digital pixel value of a pixel sensitive in one of: said first spectrum region, said third spectrum region.

B10. The indicia reading terminal of B1, wherein said plurality of analog signals comprises at least two groups of N×M pixels; and wherein said at least two groups of two or more pixels overlap by N*(M−1) pixels.

B11. The indicia reading terminal of B1, including a color pattern filter disposed over said image sensor.

B12. The indicia reading terminal of B1, wherein said frame of image data is a monochrome frame.

B13. The indicia reading terminal of B1, wherein said plurality of analog signals represents substantially all pixels of said image sensor.

B14. The indicia reading terminal of B1, wherein said plurality of analog signals represents a subset of pixels of said image sensor.

B15. The indicia reading terminal of B1, wherein said plurality of analog signals represents substantially all pixels of said image sensor if a resolution of said frame of image data is sufficient to decode said target decodable indicia; and wherein said plurality of analog signals represents a subset of pixels of said image sensor if said resolution of said frame of image data is insufficient to decode said target decodable indicia.

B16. The indicia reading terminal of B1, wherein said plurality of analog signals represents a group of adjacent pixels centered at a center of said image sensor.

B17. The indicia reading terminal of B1, wherein said group of two or more pixels is provided by a group of two or more pixels sensitive in one spectrum region.

[The following is an excerpt from U.S. patent application Ser. No. 13/217,139 with Figure numbers and element references changed to avoid duplication]

An optical indicia reading terminal can comprise a microprocessor, a memory, and an image sensor integrated circuit, all coupled to a system bus, and a hand held housing encapsulating the two-dimensional image sensor. The image sensor integrated circuit can comprise a two-dimensional image sensor including a plurality of pixels. The image sensor integrated circuit can be configured to read out a plurality of analog signals. Each analog signal of the plurality of analog signals can be representative of light incident on at least one pixel of the plurality of pixels. The image sensor integrated circuit can be further configured to derive a plurality of luminance signals from the plurality of analog signals, each luminance signal being representative of the luminance of light incident on at least one pixel of the plurality of pixels. The image sensor integrated circuit can be further configured to store a frame of image data in the terminal's memory by converting the plurality of luminance signals to a plurality of digital values, each digital value being representative of the luminance of light incident on at least one pixel of the plurality of pixels. The optical indicia reading terminal can be configured to process the frame of image data for decoding decodable indicia.

There is provided an optical indicia reading terminal comprising a microprocessor, a memory, and an image sensor integrated circuit, all coupled to a system bus, and a hand held housing encapsulating the two-dimensional image sensor. The image sensor integrated circuit can comprise a two-dimensional image sensor including a plurality of pixels. The image sensor integrated circuit can be configured to read out a plurality of analog signals. Each analog signal of the plurality of analog signals can be representative of light incident on at least one pixel of the plurality of pixels. The image sensor integrated circuit can be further configured to derive a plurality of luminance signals from the plurality of analog signals, each luminance signal being representative of the luminance of light incident on at least one pixel of the plurality of pixels. The image sensor integrated circuit can be further configured to store a frame of image data in the terminal's memory by converting the plurality of luminance signals to a plurality of digital values, each digital value being representative of the luminance of light incident on at least one pixel of the plurality of pixels. The optical indicia reading terminal can be configured to process the frame of image data for decoding decodable indicia.

In one embodiment, there is provided an optical indicia reading terminal equipped with a two-dimensional color image sensor. Using color image sensor for reading optical indicia can be advantageous due to the fact that a color image sensor can also be used for other functions performed by an optical indicia reading terminal (e.g., still image or video capturing).

The associated image sensor circuitry can be configured to read out analog signals representative of light incident on image sensor pixels, to derive luminance signals from the read-out analog signals, and then to store a frame of monochrome image data in the terminal's memory by converting the luminance signals to digital values. The optical indicia reading terminal can be configured to process the frame of image data for decoding decodable indicia.

In an illustrative embodiment, shown in FIG. 11, there is provided an EIR terminal 100 including a housing A52 comprising a head portion A54 and a handle portion A56, the latter further comprising a hand grip A58 and a trigger A60. The trigger A60 can be used to initiate signals for activating frame readout and/or certain decoding processes. Other components of EIR terminal A100 can be disposed within the housing A52. For example, an image sensor A62 can be disposed in the head portion A54 behind a housing window A63. The image sensor A62 can be configured to output an electrical signal representative of light incident on the image sensor.

EIR terminal A100 can further comprise an I/O interface which in the illustrative embodiment of FIG. 11 can be communicatively coupled to a wired connection A66. The I/O interface can be used to communicatively couple EIR terminal A100 to a companion device A68 such as a register and/or peripheral data capture devices in a point-of-sale (POS) application. Other configurations of the I/O interface may utilize wireless communication technology and/or contact-type features that do not require wires and/or wired connection A66. In certain applications of EIR terminal A100 for example, the companion device A68 may be provided by a docking station with corresponding mating contacts and/or connectors that are useful to exchange power and data, including image data captured by the imaging module A62.

Although not incorporated in the illustrative embodiment of FIG. 11, EIR A100 can also comprise a number of peripheral devices, including a display for displaying such information as image frames captured by the terminal, a keyboard, and a pointing device.

EIR terminal A100 can be used, for example, for bar code reading and decoding in POS and other applications. A skilled artisan would appreciate the fact that other uses of EIR terminal A100 are within the scope of this disclosure.

While FIG. 11 illustrates a hand held housing, a skilled artisan would appreciate the fact that other types and form factors of terminal housings are within the scope of this disclosure.

FIG. 12 illustrates a block diagram of one embodiment of the optical indicia reading terminal. Indicia reading terminal A100 can include a color image sensor A1032 comprising a multiple pixel image sensor array A1033 having pixels arranged in rows and columns, associated column circuitry A1034, and row circuitry A1035. In one embodiment, the image sensor array A1033 can be provided by a charge-coupled device (CCD) image sensor. In another embodiment, the image sensor array can be provided by a complementary metal-oxide semiconductor (CMOS) image sensor. A skilled artisan would appreciate the fact that other types of image sensors are within the scope of the invention.

Associated with the image sensor A1032 can be amplifier circuitry A1036, and an analog to digital converter A1037 which converts image information in the form of analog signals read out of image sensor A1033 into image information in the form of digital signals. Image sensor A1032 can also have an associated timing and control circuit A1038 for use in controlling e.g., the exposure period of image sensor A1032, and gain applied to the amplifier circuitry A1036. The noted circuit components A1032, A1036, A1037, and A1038 can be packaged into a common image sensor integrated circuit 1040.

In operation, the light falling on the surface of image sensor A1032 can cause accumulation of charge in each pixel. The indicia reading terminal A100 can be configured to read out analog signals representative of light incident on one or more pixels.

In one embodiment, image sensor integrated circuit A1040 can be configured to derive luminance signals from the read-out analog signals, and then to store a frame of monochrome image data in the terminal's memory by converting the luminance signals to digital values, so that terminal A100 can process the frame of image data for decoding decodable indicia. In one embodiment, image sensor integrated circuit A1040 can include an image data extracting module A1028 configured to derive luminance signals from the read-out analog signals. In another embodiment, the designation of image data extracting module can be purely functional, and the column circuitry A1034 and row circuitry A1035 can be configured to control deriving luminance signals from the read-out analog signals. In a yet another embodiment, deriving luminance signals from the read-out analog signals can be controlled by other components of image sensor integrated circuit A1040.

The analog signals can then be fed to the input of the ADC A1037. The resulting digital values representative of the analog signals can be stored in a system memory such as RAM A1080. Image frame data stored in RAM A1080 can be in the form of multibit pixel values, with each multibit pixel value representing light incident on a pixel of image sensor

A1033. A memory A1085 of terminal A100 can include RAM A1080, a nonvolatile memory such as EPROM A1082 and a storage memory device A1084 such as may be provided by a flash memory or a hard drive memory.

In one embodiment, image sensor A1032 can be configured to output image data in YUV, YbCrCb or similar format supporting independent luminance and chrominance information. In YUV model, the Y component determines the brightness of the color (referred to as luminance or luma), while the U and V components determine the color itself (the chroma). U and V components are "color difference" signals of blue minus luma (B−Y) and red minus luma (R−Y). Value of Y component can range from 0 to 1 (or 0 to 255 in digital formats), while values of U and V components can range from −0.5 to 0.5 (or −128 to 127 in signed digital form, or 0 to 255 in unsigned form). Some YUV-based standards can further limit the ranges so the out-of-bounds values can indicate special information like synchronization.

YUV color representation can be computed from RGB color representation as follows:

$$Y=0.299R+0.587G+0.114B$$

$$U=-0.147R-0.289G+0.436B$$

$$V=0.615R-0.515G-0.100B$$

Pixel data A310 can include Y component and one of U, V components as shown in FIG. 13*a*. The rate of pixel clock A320 can be twice the pixel rate. Image data extracting module A1028 can extract Y component by reading out output signals at every second pixel clock rate (plot A325 in FIG. 13*a*), thus reducing the image data acquisition bandwidth requirement.

In another embodiment, image sensor A1032 can be configured to output image data in an RGB format (e.g., RGB555, RGB565 or similar format). All three R, G, B components are available for each pixel A340, as shown in FIG. 13*b*. Thus, the rate of pixel clock A330 can be twice the pixel rate. Image data extracting module A1028 can extract Y component A345 by interpolating the R, G, B data A340, performing color correction, white balancing and/or color to monochrome conversion.

In another embodiment, image sensor A1032 can be configured to output image data in the raw RGB format. The pixel data can comprise pixel data for odd rows A382 and pixel data for even rows A384, as shown in FIG. 13*c*. Either R, G, or B component is present in each sampling, and only one of the three components is available for each pixel. Thus, the rate of pixel clock A390 is equal to the pixel rate. Image data extracting module A1028 can extract Y component A395 by interpolating the R, G, B data A382-A384, performing color correction, white balancing and/or color to monochrome conversion.

In one embodiment, indicia reading terminal A100 can be configured to bypass the image data extracting module A1028 and thus acquire a color image.

Referring again to FIG. 12, indicia reading terminal A100 can include microprocessor A1060 which can be adapted to read out image data stored in memory A1080 and subject such image data to various image processing algorithms.

In one embodiment, image sensor integrated circuit A1040 can be configured to read-out analog signals, and then to store a frame of color image data in the terminal's memory by converting the analog signals to digital values. Microprocessor A1060 can be configured to convert the frame of color image data to a frame of monochrome image data.

In one embodiment, image sensor integrated circuit A1040 can be configured to output color image data in YUV, YbCrCb or similar format supporting independent luminance and chrominance information. Microprocessor A1060 can be configured to only extract Y component from the stored frame of color image data and to store the resulting monochrome frame of image data in the terminal's memory.

In another embodiment, image sensor A1032 can be configured to output image data in an RGB format (e.g., RGB555, RGB565 or similar format). All three R, G, B components are available for each pixel A340, as shown in FIG. 13*b*. Microprocessor A1060 can be configured to convert the stored frame of color image data into a monochrome frame of image data (e.g., by interpolating the R, G, B data, performing color correction, and/or white balancing) and to store the resulting monochrome frame of image data in the terminal's memory.

In another embodiment, image sensor A1032 can be configured to output image data in the raw RGB format. The pixel data can comprise pixel data for odd rows A382 and pixel data for even rows A384, as shown in FIG. 13*c*. Either R, G, or B component is present in each sampling, and only one of the three components is available for each pixel. Microprocessor A1060 can be configured to convert the stored frame of color image data into a monochrome frame of image data (e.g., by interpolating the R, G, B data, performing color correction, and/or white balancing) and to store the resulting monochrome frame of image data in the terminal's memory.

Referring again to FIG. 12, indicia reading terminal A100 can include a direct memory access unit (DMA) A1070 for routing image information read out from image sensor A1032 that has been subject to conversion and storage to RAM A1080. In another embodiment, terminal A100 can employ a system bus providing for bus arbitration mechanism (e.g., a PCI bus) thus eliminating the need for a central DMA controller. Other embodiments of the system bus architecture and/or direct memory access components providing for efficient data transfer between the image sensor A1032 and RAM A1080 can be provided.

In another aspect, the indicia reading terminal A100 can include microprocessor A1060 which can be adapted to read out image data stored in memory A1080 and subject such image data to various image processing algorithms.

In another aspect, the indicia reading terminal A100 can include a variable focus imaging lens A1110 for use in focusing an image of a decodable indicia located within a field of view A140 on a substrate A50 onto image sensor A1033. Imaging light rays can be transmitted about imaging axis A25. Variable focus imaging lens A1110 can be adapted to be capable of multiple best focus distances and multiple focal lengths. Variable focus imaging lens A1110 can be operative to provide a new best focus distance and/or focal length within a fraction of a frame time in response to an applied input control signal being applied to the variable focus imaging lens A1110. In one embodiment, the variable focus imaging lens A1110 can be provided by a deformable imaging lens, e.g., a deformable fluid lens or gel lens. In another embodiment, the variable focus imaging lens A1110 can be provided by a non-deformable fluid lens, e.g., an electrowetting liquid lens wherein the surface tension of one or more volumes of lens liquid changes in response to a signal being applied to the lens, or a liquid crystal type lens wherein indices of refraction of one or more volumes of lens fluid change in response to a signal being applied to the lens.

The indicia reading terminal A100 can also include an illumination pattern light source bank A1204 for use in generating an illumination pattern A60 substantially corresponding to a field of view A140 of terminal A100 and an aiming pattern light source bank A1208 for use in generating an aiming pattern A70 on substrate A50. Shaping optics A1205 and A1209 can be provided for shaping light from bank A1204 and bank A1208 into pattern A60 and into pattern A70 respectively. In use, terminal A100 can be oriented by an operator with respect to a substrate A50 bearing decodable indicia A15 in such manner that aiming pattern A70 is projected on a decodable indicia A15. In the example of FIG. 12, decodable indicia A15 is provided by a 1D bar code symbol. Decodable indicia could also be provided by 2D bar code symbols or optical character recognition (OCR) characters.

Each of illumination pattern light source bank A1204 and aiming pattern light source bank A1208 can include one or more light sources. Variable focus imaging lens A1110 can be controlled with use of focus control module A30 and the illumination assembly comprising illumination pattern light source bank A1204 and aiming pattern light source bank A1208 can be controlled with use of illumination assembly control module A1220. Focus control module A30 can send signals to variable focus imaging lens A1110 e.g., for changing a best focus distance and/or a focal length of variable focus imaging lens A1110. Illumination assembly control module A1220 can send signals to illumination pattern light source bank A1204 e.g., for changing a level of illumination output by illumination pattern light source bank A1204.

In one example, the indicia reading terminal A100 can be adapted so that illumination assembly control module A1220 controls light source bank A1204 to have a relatively lower level of illumination output when the best focus distance of imaging lens A1110 is set to a first shorter best focus distance, and a relatively higher level of illumination output when the best focus distance of imaging lens A1110 is set at a longer best focus distance. Such variable illumination settings can be varied within a time that trigger signal A502 remains active. The variable illumination level settings can be synchronized to the certain lens settings set forth in connection with the various configurations described herein infra.

Indicia reading terminal A100 can also include a number of peripheral devices, e.g., a display A1304 for displaying such information as captured image frames, keyboard A1404, pointing device A1406, and trigger A1408 which may be used to make active a trigger signal A502 for activating frame readout and/or certain decoding processes. The indicia reading terminal A100 can be adapted so that activation of trigger A1408 activates trigger signal A502 and initiates a decode attempt.

Indicia reading terminal A100 can also include various interface circuits for coupling the peripheral devices to system address/data bus (system bus) A1500, for communication with microprocessor A1060 which can also be coupled to system bus A1500. The indicia reading terminal 100 can include circuit A1026 for coupling image sensor timing and control circuit A1038 to system bus A1500, interface circuit A1118 for coupling focus control module A30 to system bus A1500, interface circuit A1218 for coupling illumination control assembly A1220 to system bus A1500, interface circuit A1302 for coupling display A1304 to system bus A1500, and interface circuit A1402 for coupling keyboard A1404, pointing device A1406, and trigger A1408 to system bus A1500.

In a further aspect, indicia reading terminal A100 can include one or more I/O interfaces A1604, A1608 for providing communications with external devices (e.g., a cash register server, a store server, an inventory facility server, a peer terminal A100, a local area network base station, or a cellular base station). I/O interfaces A1604, A1608 can be interfaces of any combination of known computer interfaces, e.g., Ethernet (IEEE 802.3), USB, IEEE 802.11, Bluetooth, CDMA, GSM.

Referring now to FIGS. 14 and 15, an imaging module A300 for supporting components of terminal A100 can include image sensor integrated circuit A1040 disposed on a printed circuit board A1802 together with illumination pattern light source bank A1204 and aiming pattern light source bank A1208 each shown as being provided by a single light source. Imaging module A300 can also include containment A1806 for image sensor integrated circuit A1040, and housing A1810 for housing imaging lens A1110. Imaging module A300 can also include optical plate A1814 having optics for shaping light from bank A1204 and bank A1208 into predetermined patterns. Imaging module A300 can be disposed in a hand held housing A11, an example of which is shown in FIG. 16. Disposed on hand held housing A11 can be display A1304, trigger A1408, pointing device A1406, and keyboard A1404.

A small sample of systems methods and apparatus that are described herein is as follows:

A1. An optical indicia reading terminal comprising:

a microprocessor coupled to a system bus;

a memory communicatively coupled to said system bus;

an image sensor integrated circuit coupled to said system bus, said image sensor integrated circuit having a two-dimensional color image sensor including a plurality of pixels;

a hand held housing encapsulating said two-dimensional image sensor;

wherein said image sensor integrated circuit is configured to read out a plurality of analog signals, each analog signal of said plurality of analog signals being representative of light incident on at least one pixel of said plurality of pixels;

wherein said image sensor integrated circuit is further configured to derive a plurality of luminance signals from said plurality of analog signals, each luminance signal of said plurality of luminance signals being representative of a luminance of light incident on at least one pixel of said plurality of pixels;

wherein said image sensor integrated circuit is further configured to store a frame of image data in said memory by converting said plurality of luminance signals to a plurality of digital values, each digital value being representative of a luminance of light incident on at least one pixel of said plurality of pixels; and wherein said optical indicia reading terminal is configured to process said frame of image data for decoding decodable indicia.

A2. The optical indicia reading terminal of A1 further comprising an imaging lens configured to focus an image of a target decodable indicia onto said two-dimensional image sensor.

A3. The optical indicia reading terminal of A1, wherein said image sensor integrated circuit is configured to read out a plurality of RGB analog signals.

A4. The optical indicia reading terminal of A1, wherein said image sensor integrated circuit is configured to read out a plurality of YUV analog signals.

A5. The optical indicia reading terminal of A1, wherein said frame of image data is a monochrome frame.

A6. The optical indicia reading terminal of A1 further including at least one of: a display, a keyboard, and a communication interface.

A7. The optical indicia reading terminal of A2 further including a trigger for activating readout of said plurality of analog signals.

A8. The optical indicia reading terminal of A1, wherein said image sensor integrated circuit further comprises at least one of: an amplifier, an analog-to-digital converter, and a control circuit.

A9. The optical indicia reading terminal of A1, wherein said color image sensor comprises a multiple pixel image sensor array having pixels arranged in rows and columns, a column circuitry, and a row circuitry.

A10. The optical indicia reading terminal of A1, wherein said color image sensor comprises a multiple pixel image sensor array having pixels arranged in rows and columns, said image sensor array provided by a charge-coupled device (CCD) image sensor.

A11. The optical indicia reading terminal of A1, wherein said color image sensor comprises a multiple pixel image sensor array having pixels arranged in rows and columns, said image sensor array provided by a complementary metal-oxide semiconductor (CMOS) image sensor.

[End of excerpt from U.S. patent application Ser. No. 13/217,139]

While the present invention has been described with reference to a number of specific embodiments, it will be understood that the true scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

We claim:

1. A method comprising:

providing an image sensor integrated circuit having a two-dimensional image sensor, said two-dimensional image sensor including a plurality of pixels arranged in repetitive patterns, each pattern of said repetitive patterns including at least one pixel sensitive in a first spectrum region, at least one pixel sensitive in a second spectrum region, and at least one pixel sensitive in a third spectrum region;

reading out a plurality of analog signals, each analog signal of said plurality of analog signals being representative of light incident on a group of pixels of said plurality of pixels, said plurality of analog signals being representative at least two groups of pixels, wherein said at least two groups of pixels overlap, and wherein the reading out comprises transferring charges of pixels of a plurality of rows of pixels of said two-dimensional image sensor to an output register prior to shifting pixel charges from the output register to an analog amplifier;

converting said plurality of analog signals to a plurality of digital signals; and processing said frame of image data for attempting to decode for decodable indicia.

2. The method of claim 1, wherein said first spectrum region is provided by a red spectrum region, said second spectrum region is provided by a green spectrum region, and said third spectrum region is provided by a blue spectrum region.

3. The method of claim 1, wherein said group of two or more pixels is provided by a group of four pixels including a pixel sensitive in said first spectrum region, two pixels sensitive in said second spectrum region, and a pixel sensitive in said third spectrum region.

4. The method of claim 1, wherein said group of two or more pixels is provided by one of a group of N×N adjacent pixels, wherein N is a positive integer and a group of M×N adjacent pixels, wherein M and N are positive integers.

5. The method of claim 1, wherein said each analog signal is equal to one of: a sum of analog signals representative of light incident on one or more pixels of said group of pixels, an average of analog signals representative of light incident one or more pixels of said group of pixels.

6. The method of claim 1, wherein said each analog signal is equal to a sum of analog signals representative of light incident on two or more pixels of said group of pixels.

7. The method of claim 1, wherein said each analog signal is equal to an average of analog signals representative of light incident on two or more pixels of said group of pixels.

8. The method of claim 1, wherein said plurality of analog signals represents a subset of pixels of said image sensor.

9. The method of claim 1, wherein said plurality of analog signals represents substantially all pixels of said image sensor if a resolution of said frame of image data is sufficient to decode said target decodable indicia; and wherein said plurality of analog signals represents a subset of pixels of said image sensor if said resolution of said frame of image data is insufficient to decode said target decodable indicia.

10. The method of claim 1, wherein said plurality of analog signals represents a group of adjacent pixels centered at a center of said image sensor.

11. The method of claim 1, wherein said group of two or more pixels is provided by a group of two or more pixels sensitive in one spectrum region.

* * * * *